US011096206B2

(12) United States Patent
Aiba et al.

(10) Patent No.: US 11,096,206 B2
(45) Date of Patent: Aug. 17, 2021

(54) TERMINAL APPARATUS, BASE STATION APPARATUS, COMMUNICATION METHOD, AND INTEGRATED CIRCUIT FOR GENERATING MEDIUM ACCESS CONTROL PROTOCOL DATA UNITS

(71) Applicants: SHARP KABUSHIKI KAISHA, Sakai (JP); FG Innovation Company Limited, Tuen Mun (CN)

(72) Inventors: Tatsushi Aiba, Sakai (JP); Shoichi Suzuki, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/319,152

(22) PCT Filed: Jul. 14, 2017

(86) PCT No.: PCT/JP2017/025742
§ 371 (c)(1),
(2) Date: Jan. 18, 2019

(87) PCT Pub. No.: WO2018/016438
PCT Pub. Date: Jan. 25, 2018

(65) Prior Publication Data
US 2020/0029352 A1    Jan. 23, 2020

(30) Foreign Application Priority Data
Jul. 22, 2016    (JP) .............................. JP2016-144083

(51) Int. Cl.
*H04W 72/12* (2009.01)
*H04W 28/02* (2009.01)
(Continued)

(52) U.S. Cl.
CPC ... *H04W 72/1278* (2013.01); *H04W 28/0278* (2013.01); *H04W 72/14* (2013.01)

(58) Field of Classification Search
CPC .............. H04W 72/1278; H04W 72/14; H04W 28/0278
See application file for complete search history.

(56) References Cited

U.S. PATENT DOCUMENTS

| 2011/0128859 A1* | 6/2011 | Bucknell | ................. | H04L 47/34 |
|---|---|---|---|---|
| | | | | 370/241 |
| 2013/0077514 A1* | 3/2013 | Dinan | ................... | H04L 5/0057 |
| | | | | 370/252 |

(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.6.0 (Jun. 2015).

(Continued)

*Primary Examiner* — Jenee Holland
(74) *Attorney, Agent, or Firm* — ScienBiziP, P.C.

(57) ABSTRACT

A terminal apparatus includes a receiver configured to receive a first uplink grant used to indicate activation of a semi-persistent scheduling, a higher layer processing unit configured to store the first uplink grant as a configured uplink grant, and a transmitter configured to transmit a medium access control (MAC) protocol data unit corresponding to the configured uplink grant, wherein the higher layer processing unit does not generate the MAC protocol data unit in a case that the MAC protocol data unit includes only a MAC control element for a padding buffer status (BSR) report and aperiodic channel state information (CSI) is not requested.

4 Claims, 12 Drawing Sheets

(51) Int. Cl.
*H04W 72/14* (2009.01)
*H04W 24/10* (2009.01)

(56) References Cited

U.S. PATENT DOCUMENTS

| | | | | |
|---|---|---|---|---|
| 2013/0107835 A1* | 5/2013 | Aiba | H04W 72/0406 | 370/329 |
| 2014/0056243 A1* | 2/2014 | Pelletier | H04W 74/04 | 370/329 |
| 2014/0198677 A1* | 7/2014 | Xu | H04L 1/0009 | 370/252 |
| 2014/0226621 A1* | 8/2014 | Choi | H04W 36/0061 | 370/331 |
| 2014/0241272 A1* | 8/2014 | Griot | H04W 74/0833 | 370/329 |
| 2014/0334392 A1* | 11/2014 | Gage | H04L 5/0092 | 370/329 |
| 2015/0156764 A1* | 6/2015 | Yang | H04L 5/001 | 370/329 |
| 2015/0327220 A1* | 11/2015 | Pan | H04W 72/042 | 370/329 |
| 2016/0044678 A1* | 2/2016 | Kwon | H04W 76/27 | 370/329 |
| 2016/0150475 A1* | 5/2016 | Rune | H04W 76/27 | 370/311 |
| 2017/0006628 A1* | 1/2017 | Takahashi | H04W 72/1284 | |
| 2017/0086168 A1* | 3/2017 | Takahashi | H04W 28/0278 | |
| 2017/0289995 A1* | 10/2017 | Lin | H04W 72/12 | |
| 2018/0115957 A1* | 4/2018 | Lin | H04W 52/365 | |
| 2018/0234279 A1* | 8/2018 | Dinan | H04W 56/0045 | |
| 2018/0324768 A1* | 11/2018 | Shaheen | H04W 72/0446 | |

OTHER PUBLICATIONS

Ericsson, "L2 enhancements to reduce latency", R2-153490, 3GPP TSG-RAN WG2 #91, Beijing, China, Aug. 24-28, 2015.
Ericsson, "Introduction of L2 Latency reduction techniques", R2-165767, 3GPP TSG-RAN WG2 Meeting #95, Gothenburg, Sweden, Aug. 22-26, 2016.
Xiuwen Duan et al: "An Improved Approach of Sending BSR and SR Based on MAC Layer in LTE System", Business Computing and Global Informatization (BCGIN), 2011 International Conference on, IEEE, Jul. 29, 2011 (Jul. 29, 2011), pp. 520-523, XP032046943, DOI: 10.1109/BCGIN.2011.137 ISBN: 978-Jan. 4577-0788-9 * paragraph [IV.C]*.
Samsung, "Skipping uplink transmission with no. data to transmit", R2-153332, 3GPP TSG-RAN WG2 Meeting #91 Aug. 24 to 28, 2015, Beijing, China.
Nokia et al., "Skipping empty BSR and feedback for SPS activation/deactivation", R2-162504, 3GPP TSG-RAN WG2 Meeting #93bis Dubrovnik, Croatia, Apr. 11-15, 2016.

* cited by examiner

FIG. 3A Special fields for Semi-Persistent Scheduling Activation PDCCH/EPDCCH Validation

|  | UL DCI format |
|---|---|
| TPC command for scheduled PUSCH | set to '00' |
| Cyclic shift DMRS | Set to '000' |
| Modulation and coding scheme and redundancy version | MSB is set to '0' |

FIG. 3B Special fields for Semi-Persistent Scheduling Release PDCCH/EPDCCH Validation

|  | UL DCI format |
|---|---|
| TPC command for scheduled PUSCH | set to '00' |
| Cyclic shift DMRS | Set to '000' |
| Modulation and coding scheme and redundancy version | set to '11111' |
| Resource block assignment and hopping resource allocation | set to all '1's |

|  | FIRST DCI (SPS activation command) | SECOND DCI (SPS release command) | |
|---|---|---|---|
|  | CSI request field is set to trigger a report | CSI request field is set to trigger a report | CSI request field is set to trigger a report |
| THIRD PARAMETER (*skipUplinkTxSPS*) IS CONFIGURED | Aperiodic CSI is reported | Aperiodic CSI is reported | Aperiodic CSI is not reported |
| THIRD PARAMETER (*skipUplinkTxSPS*) IS NOT CONFIGURED | Aperiodic CSI is reported | Aperiodic CSI is not reported | Aperiodic CSI is not reported |

FIG. 9

TERMINAL APPARATUS, BASE STATION APPARATUS, COMMUNICATION METHOD, AND INTEGRATED CIRCUIT FOR GENERATING MEDIUM ACCESS CONTROL PROTOCOL DATA UNITS

TECHNICAL FIELD

The present invention relates to a terminal apparatus, a base station apparatus, a communication method, and an integrated circuit.

This application claims priority based on Japanese Patent Application No. 2016-144083 filed on Jul. 22, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL. 1). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. In such a cellular communication system, a single base station apparatus may manage multiple cells.

In the 3GPP, latency reduction enhancements have been studied. For example, for the latency reduction enhancements, Scheduling request first grant or Pre-scheduled first grant has been studied (NPL. 2).

CITATION LIST

Non Patent Literature

NPL 1: "3GPP TS 36.321 V12.6.0 (2015-06) Evolved Universal Terrestrial Radio Access (E-UTRA); Medium Access Control (MAC) protocol specification (Release 12)", 8Jul. 2015.

NPL 2: "L2 enhancements to reduce latency", R2-153490, Ericsson, 3GPP TSG-RAN WG2 #91, Beijing, China, 24-28 Aug. 2015.

SUMMARY OF INVENTION

Technical Problem

However, for the radio communication system described above, a concrete procedure when performing transmission in uplink has not been sufficiently studied.

An aspect of the present invention has been made in light of the foregoing, and an object of the present invention is to provide a terminal apparatus, a base station apparatus, a communication method, and an integrated circuit, which enable efficient transmission in uplink.

Solution to Problem (1) To accomplish the object described above, aspects of the present invention are contrived to provide the following measures. Specifically, an invention terminal apparatus according to an aspect of the present includes: a receiver configured to receive a first uplink grant used to indicate activation of a semi-persistent scheduling; a higher layer processing unit configured to store the first uplink grant as a configured uplink grant; and a transmitter configured to transmit a medium access control (MAC) protocol data unit corresponding to the configured uplink grant, wherein the higher layer processing unit does not generate the MAC protocol data unit in a case that the MAC protocol data unit includes only a MAC control element for a padding buffer status (BSR) report and aperiodic channel state information (CSI) is not requested.

(2) In the terminal apparatus described above according to an aspect of the present invention, the receiver receives a radio resource control message including a parameter, and the higher layer processing unit does not generate the MAC protocol data unit in a case that the parameter is configured, the MAC protocol data unit includes only the MAC control element for the padding BSR report, and the aperiodic CSI is not requested.

(3) A base station apparatus according to an aspect of the present invention includes: a transmitter configured to transmit a first uplink grant used to indicate activation of a semi-persistent scheduling; a higher layer processing unit configured to store the first uplink grant as a configured uplink grant; and a receiver configured to receive a medium access control (MAC) protocol data unit corresponding to the configured uplink grant, wherein the higher layer processing unit presumes that the MAC protocol data unit is not generated in a case that the MAC protocol data unit includes only a MAC control element for a padding buffer status (BSR) report and aperiodic channel state information (CSI) is not requested.

(4) In the base station apparatus described above according to an aspect of the present invention, the transmitter transmits a radio resource control message including a parameter, and the higher layer processing unit presumes that the MAC protocol data unit is not generated in a case that the parameter is configured, the MAC protocol data unit includes only the MAC control element for the padding BSR report, and the aperiodic CSI is not requested.

(5) A method of a terminal apparatus according to an aspect of the present invention includes the steps of: receiving a first uplink grant used to indicate activation of a semi-persistent scheduling; storing the first uplink grant as a configured uplink grant; and transmitting a medium access control (MAC) protocol data unit corresponding to the configured uplink grant, wherein the MAC protocol data unit is not generated in a case that the MAC protocol data unit includes only a MAC control element for a padding buffer status (BSR) report and aperiodic channel state information (CSI) is not requested.

(6) The method of a terminal apparatus described above according to an aspect of the present invention further includes the steps of: receiving a radio resource control message including a parameter; and not generating the MAC protocol data unit in a case that the parameter is configured, the MAC protocol data unit includes only the MAC control element for the padding BSR report, and the aperiodic CSI is not requested.

(7) A method of a base station apparatus according to an aspect of the present invention includes steps of: transmitting a first uplink grant used to indicate activation of a semi-persistent scheduling; storing the first uplink grant as a configured uplink grant; and receiving a medium access control (MAC) protocol data unit corresponding to the configured uplink grant, wherein it is presumed that the MAC protocol data unit is not generated in a case that the MAC protocol data unit includes only a MAC control element for a padding buffer status (BSR) report and aperiodic channel state information (CSI) is not requested.

(8) The method of the base station apparatus described above according to an aspect of the present invention further includes steps of: transmitting a radio resource control message including a parameter, and presuming that the MAC protocol data unit is not generated in a case that the parameter is configured, the MAC protocol data unit includes only the MAC control element for the padding BSR report, and the aperiodic CSI is not requested.

(9) An integrated circuit equipped in a terminal apparatus according to an aspect causes the terminal apparatus to exert functions to: receive a first uplink grant used to indicate activation of a semi-persistent scheduling; store the first uplink grant as a configured uplink grant; and transmit a medium access control (MAC) protocol data unit corresponding to the configured uplink grant, wherein the MAC protocol data unit is not generated in a case that the MAC protocol data unit includes only a MAC control element for a padding buffer status (BSR) report and aperiodic channel state information (CSI) is not requested.

(10) The integrated circuit equipped in the terminal apparatus described above according to an aspect of the present invention further causes the terminal apparatus to exert a function to receive a radio resource control message including a parameter, wherein the MAC protocol data unit is not generated in a case that the parameter is configured, the MAC protocol data unit includes only the MAC control element for the padding BSR report, and the aperiodic CSI is not requested.

(11) An integrated circuit equipped in a base station apparatus according to an aspect of the present invention causes the base station apparatus to exert functions to: transmit a first uplink grant used to indicate activation of a semi-persistent scheduling; store the first uplink grant as a configured uplink grant; and receive a medium access control (MAC) protocol data unit corresponding to the configured uplink grant, wherein it is presumed that the MAC protocol data unit is not generated in a case that the MAC protocol data unit includes only a MAC control element for a padding buffer status (BSI report and aperiodic channel state information (CSI) is not requested.

(12) The integrated circuit equipped in the base station apparatus according to an aspect of the present invention further causes the base station apparatus to exert a function to transmit a radio resource control message including a parameter, wherein it is presumed that the MAC protocol data unit is not generated in a case that the parameter is configured, the MAC protocol data unit includes only the MAC control element for the padding BSR report, and the aperiodic CSI is not requested.

Advantageous Effects of Invention

According to an aspect of the present invention, transmission in uplink can be executed efficiently.

BRIEF DESCRIPTION OF DRAWINGS

FIGS. 3A and 3B are diagrams illustrating an example of special fields for semi-persistent scheduling according to the present embodiment.

FIG. 9 is another diagram illustrating an example of the method for transmission in uplink according to the present embodiment.

DESCRIPTION OF EMBODIMENTS

Embodiments of the present invention will be described below.

Figure 1:
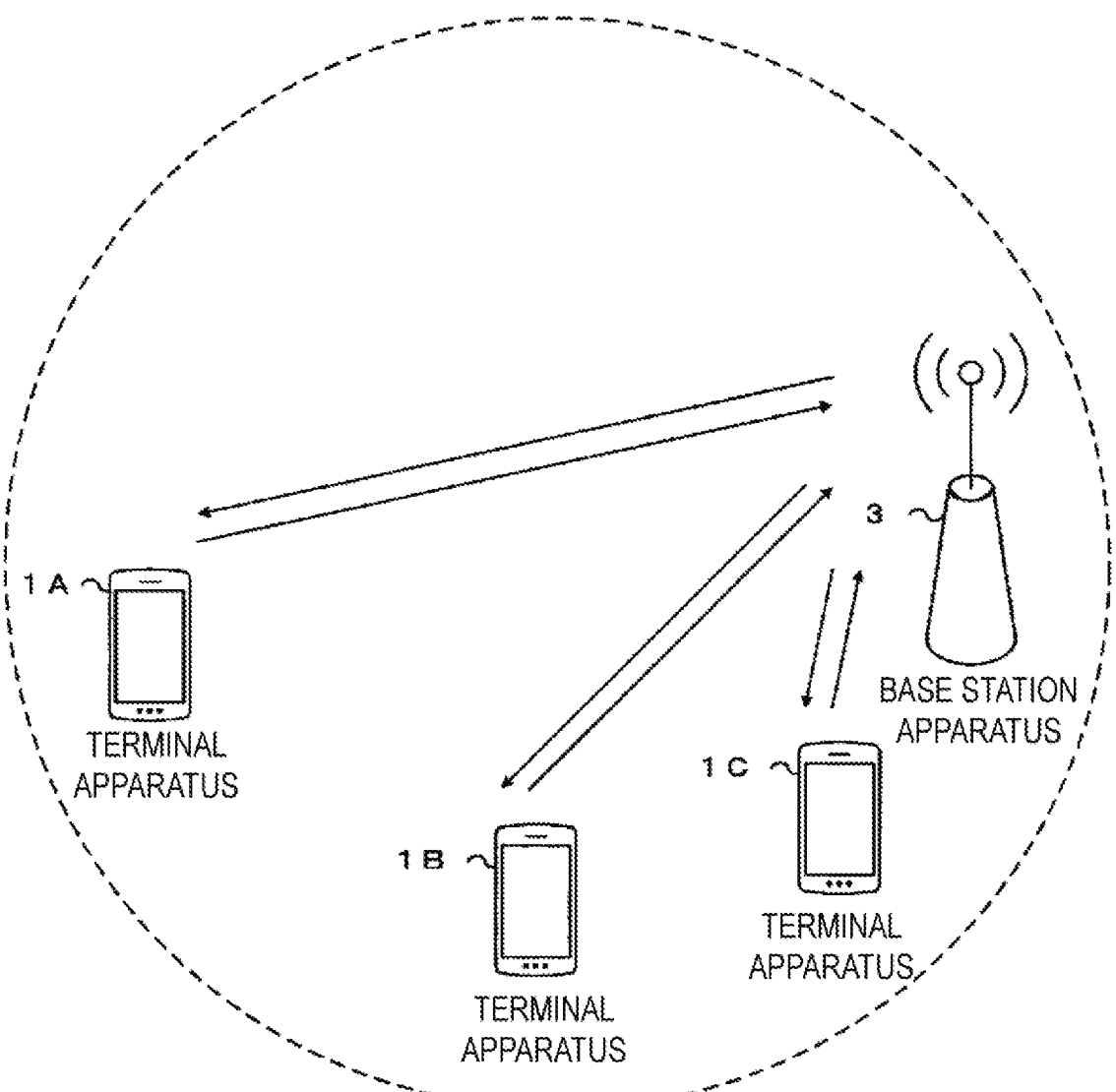
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, each of the terminal apparatuses 1A to 1C is also referred to as a terminal apparatus 1.

Physical channels and physical signals according to the present embodiment will be described.

In FIG. 1, the following uplink physical channels are used for uplink radio communication from the terminal apparatus 1 to the base station apparatus 3. Here, the uplink physical channels are used to transmit information output from higher layers.

Physical Uplink Control Channel (PUCCH)
Physical Uplink Shared Channel (PUSCH)
Physical Random Access Channel (PRACH)

The PUCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK).

Here, the HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PUSCH)). In other words, the HARQ-ACK may indicate acknowledgment (ACK) or negative-acknowledgment (HACK). The HARQ-ACK is also referred to as ACK/NACK, HARQ feedback, HARQ acknowledge, HARQ information, or HARQ control information.

The PUSCH is used for transmission of uplink data (Uplink-Shared Channel (UL-SCH, UL-SCH data)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station apparatus 3 and the terminal apparatus 1 exchange (transmit and/or receive) signals with each other in their respective higher layers. For example, the base station apparatus 3 and the terminal apparatus 1 may transmit and/or receive radio resource control (RRC) signaling (also referred to as RRC message or RRC information) in the RRC layer, respectively. The base station apparatus 3 and the terminal apparatus 1 may transmit and/or receive a Medium Access Control (MAC) control element in a MAC layer, respectively. Here, the RRC signaling and/or the MAC control element is also referred to as higher layer signaling.

The PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user-equipment-specific information (information unique to user equipment) may be transmitted through signaling dedicated to the certain terminal apparatus 1.

The PRACH is used to transmit a random access preamble. The PRACH may be used to indicate an initial connection establishment procedure, a handover procedure, a connection re-establishment procedure, uplink transmission synchronization (timing adjustment), and a PUSCH resource request.

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 uses the SRS in order to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid Automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (HACK) for the uplink data (Uplink Shared Channel (UL-SCH)) received by the base station apparatus 3.

The PDCCH and the EPDCCH are used to transmit Downlink Control Information (DCI). Here, multiple DCI formats are defined for transmission of the downlink control information. In other words, a field for the downlink control information is defined in a DCI format and is mapped to information bits.

For example, the DCI formats for downlink (e.g., DCI format 1, DCI format 1A and/or DCI format 1C) to be used for the scheduling of one PDSCH in one cell (transmission of a single downlink transport block) may be defined.

Here, each of the downlink DCI formats includes information of the scheduling of the PDSCH. For example, the downlink DCI format includes downlink control information such as a Carrier Indicator Field (CIF), information of a HARQ process number, information of a Modulation and Coding Scheme (MCS), information of a Redundancy version, and/or information of Resource block assignment. Here, the downlink DCI format is also referred to as downlink grant and/or downlink assignment.

Furthermore, for example, DCI formats for uplink (e.g., DCI format 0 and DCI format 4) to be used for the scheduling of one PUSCH in one cell (transmission of a single uplink transport block) are defined.

Here, each of DCI formats for the uplink includes information of the scheduling of the PUSCH. For example, the DCI format of the uplink includes downlink control information such as a Carrier Indicator Field (CIF), information on a transmit power command (TPC command) for a scheduled PUSCH, information on Cyclic shift DMRS, information on a Modulation and Coding Scheme (MCS) and/or redundancy version, and/or, information on Resource block assignment and/or hopping resource allocation, and a CSI request field. Here, the DCI format of the uplink is also referred to as uplink grant and/or Uplink assignment.

Here, the CSI request field may be a field mapped to information used to request CSI transmission (CSI request). Specifically, the CSI request field may be used to request (indicate) the CSI transmission.

For example, the base station apparatus 3 may trigger the CSI transmission (also referred to as the aperiodic CSI report) using the PUSCH by a setting such that a report is triggered using a CSI request field. In a case of the setting such that a report is triggered using a CSI request field, the terminal apparatus 1 may perform aperiodic CSI reporting.

For example, the base station apparatus 3 may use a CSI request field (1-bit CSI request field) set to "1" to set such that a report is triggered. The base station apparatus 3 may also use a CSI request field (2-bit CSI request field) set to "01", "10", or "11" to set such that a report is triggered. Similarly, the base station apparatus 3 may use a 3-bit CSI request field to set such that a report is triggered.

In a case that the terminal apparatus 1 is set to trigger a report using a CSI request field, based on decoding of an uplink grant (e.g., a first UL grant) for a certain serving cell in a subframe n, the terminal apparatus 1 may perform the aperiodic CSI reporting using the PUSCH in a subframe n+k (e.g., k is a positive integer, and may be 4) in the certain serving cell.

In a case that a PDSCH resource is scheduled in accordance with the down k assignment, the terminal apparatus 1 may receive downlink data on the scheduled PDSCH. In a case that a PUSCH resource is scheduled in accordance with the uplink grant, the terminal apparatus 1 may transmit uplink data and/or uplink control information of the scheduled PUSCH.

Here, the terminal apparatus 1 may monitor a set of PDCCH candidates and/or EPDCCH candidates. Hereinafter, the PDCCH may indicate a PDCCH and/or an EPDDCH. Here, the PDCCH candidates are candidates which the PDCCH may be mapped to and/or transmitted on by the base station apparatus 3. Furthermore "monitor" may imply that the terminal apparatus 1 attempts to decode each PDCCH in the set of PDCCH candidates in accordance with each of all the monitored DCI formats.

The set of PDCCH candidates to be monitored by the terminal apparatus 1 is also referred to as a search space. The search space may include a Common Search Space (CSS). For example, the CSS may be defined as a space common to multiple terminal apparatuses 1. The search space may include a LIE-specific Search Space (USS). For example, the USS may be defined at least based on a C-RNTI assigned to the terminal apparatus 1. The terminal apparatus 1 may monitor the PDCCHs in the CSS and/or USS to detect a PDCCH destined for the terminal apparatus 1 itself.

Here, an RNTI assigned to the terminal apparatus 1 by the base station apparatus 3 is used for the transmission of the downlink control information (transmission on the PDCCH). Specifically, Cyclic Redundancy Check (CRC) parity bits are attached to the DCI format (or downlink control information), and after the attaching, the CRC parity bits are scrambled with the RNTI. Here, the CRC parity bits attached to the DCI format may be obtained from a payload of the DCI format.

The terminal apparatus 1 attempts to decode the DCI format to which the CRC parity bits scrambled with the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled with the RNTI. The terminal apparatus 1 may detect the PDCCH including the DCI format to which the CRC parity bits scrambled with the RNTI are attached.

Here, the RNTI may include a Cell-Radio Network Temporary Identifier (C-RNTI). The C-RNTI is an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal apparatus 1 and used for Semi-Persistent Scheduling (SPS). The SPS C-RNTI may be used for semi-persistently scheduled unicast transmission.

Here, a semi-persistently scheduled transmission also means a periodically scheduled transmission. For example, the SPS C-RNTI may be used for activation, reactivation, and/or retransmission of the semi-persistently scheduled transmission. Hereinafter, the activation may include the meaning of the reactivation and/or the retransmission.

The SPS C-RNTI may be used for release and/or deactivation of the semi-persistently scheduled transmission. Hereinafter, release also means deactivation. Here, an RNTI may be newly defined for the latency reduction. For example, the SPS C-RNTI in the present embodiment may include an RNTI newly defined for the latency reduction.

The PDSCH is used to transmit downlink data (Downlink Shared Channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (Multicast Channel (MCH)).

In FIG. 1, the following downlink physical signals are used for downlink radio communication. Here, the downlink physical signals are not used to transmit the information output from the higher layers but is used by the physical layer.

Synchronization signal (SS)
Downlink Reference Signal (DL RS)

The synchronization signal is used for the terminal apparatus 1 to take synchronization in a frequency domain and a time domain in the downlink. In a TDD scheme, the synchronization signal is mapped to subframes 0, 1, 5, and 6 within a radio frame. In a FDD scheme, the synchronization signal is mapped to subframes 0 and 5 within a radio frame.

The downlink reference signal is used for the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific Reference Signal (CRS)
UE-specific Reference Signal (URS) relating to the PDSCH
Demodulation Reference Signal (DMRS) relating to the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference Signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are the transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a coding process is performed for each codeword.

Hereinafter, carrier aggregation will be described.

In the present embodiment, one or multiple serving cells may be configured for the terminal apparatus 1. A technology in which the terminal apparatus 1 communicates via the multiple serving cells is referred to as cell aggregation or carrier aggregation.

Here, the present embodiment may apply to one or each of the multiple serving cells configured for the terminal apparatus 1. Alternatively, the present embodiment may apply to one or some of the multiple serving cells configured for the terminal apparatus 1. Alternatively, the present embodiment may apply to one or each of the multiple serving cell groups configured for the terminal apparatus 1.

In the present embodiment, Time Division Duplex (TDD) and/or Frequency Division Duplex (FDD) may be applied. Here, for the carrier aggregation, TDD or FDD may apply to one or all of the multiple serving cells. Alternatively, for the carrier aggregation, serving cells to which TDD applies and serving cells to which FDD applies may be aggregated. Here, a frame structure for FDD is also referred to as Frame structure type 1. A frame structure for TDD is also referred to as Frame structure type 2.

Here, one or multiple configured serving cells may include one primary cell and one or multiple secondary cells. For example, the primary cell may be a serving cell in which an initial connection establishment procedure has been performed, a serving cell in which a connection re-establishment procedure has been initiated, or a cell designated as the primary cell by a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

A configuration of a slot according to the present embodiment be described below.

Figure 2:
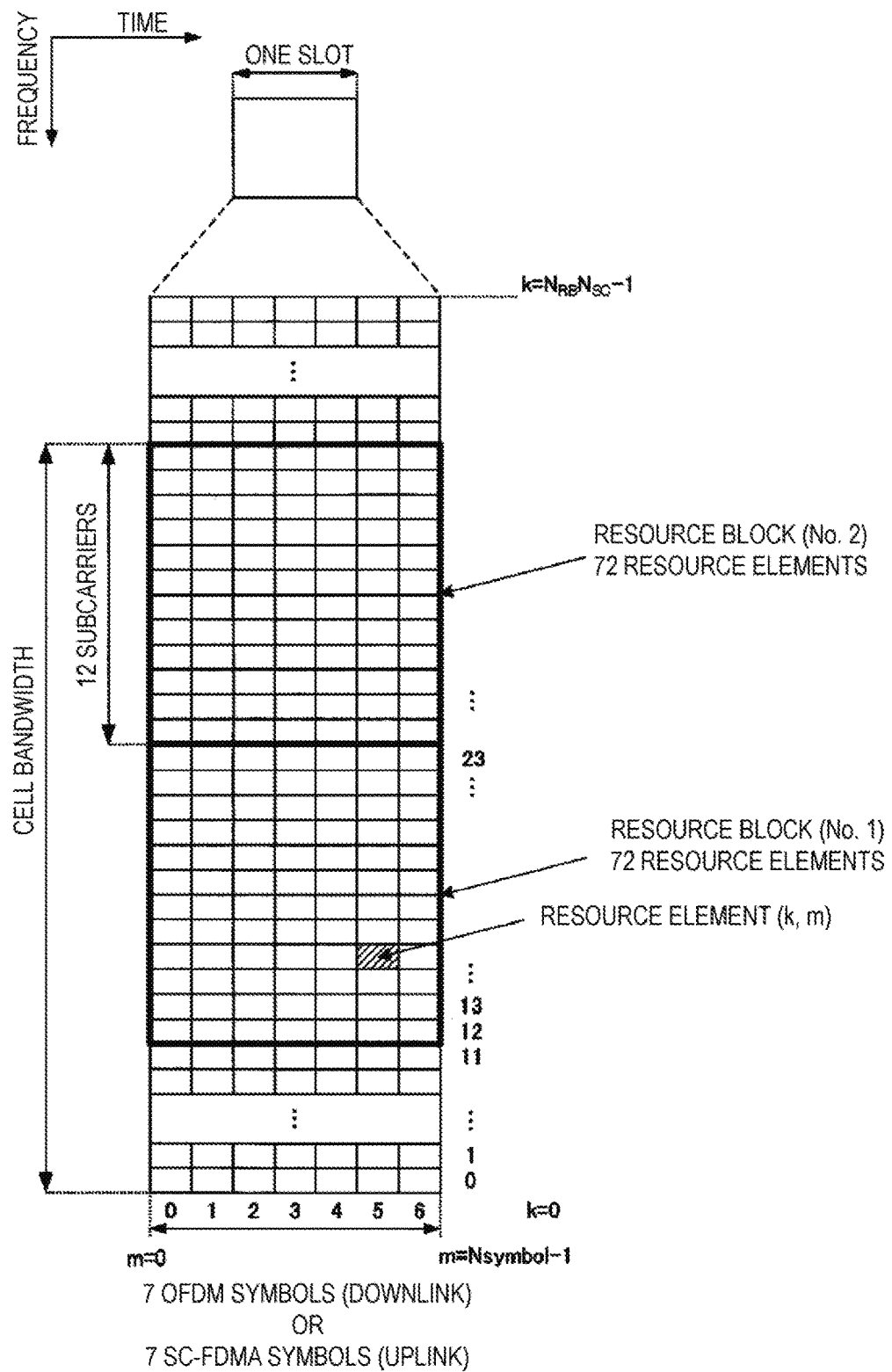
FIG. 2 is a diagram illustrating a configuration of a slot according to the present embodiment.

FIG. 2 is a diagram illustrating the configuration of the slot according to the present embodiment. In FIG. 2, a horizontal axis represents a time axis, and a vertical axis represents a frequency axis. Here, a normal Cyclic Prefix (CP) may apply to an OFDM symbol. Alternatively, an extended Cyclic Prefix (CP) may apply to the OFDM symbol. The physical signal or physical channel transmitted in each of the slots is expressed by a resource grid.

For example, sizes of the various fields in the time domain may be expressed by the number of time units $T_s=1/(15000 \cdot 2048)$ seconds. A length of the radio frame may be $T_f=307200 \cdot T_s=10$ ms. Here, each of the radio frames may include 10 contiguous subframes in the time domain. A length of each subframe may be $T_{subframe}=30720 \cdot T_s=1$ ms. Each of subframes i may include two contiguous slots in the time domain.

The two contiguous slots in the time domain may be a slot having a slot number $n_s$ of 2i in the radio frame and a slot having a slot number $n_s$ of 2i+1 in the radio frame. A length of each slot may be $T_{slot}=153600 \cdot n_s=0.5$ ms. Each of the radio frames may include 10 contiguous subframes in the time domain. Each of the radio frames includes 20 contiguous slots ($n_s=0, 1, \ldots, 19$) in the time domain. Specifically, the radio frame, subframe, and slot may be fields in the time domain. A field in the time domain is also referred to as a Transmission Time Interval (TTI).

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (PUSCH, PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot, in the time domain and correspond to 180 kHz in the frequency domain. The physical resource blocks may be numbered from zero in the frequency domain.

Here, in the present embodiment, as the description of the process in the terminal apparatus 1, described are process of the MAC entity in the terminal apparatus 1, a "Multiplexing and assembly" entity in the terminal apparatus 1 (hereinafter, also referred to as a first entity), and/or an HARQ entity in the terminal apparatus 1. In other words, the present embodiment describes the process of the MAC entity in the terminal apparatus 1, the first entity in the terminal apparatus 1, and/or the HARQ entity in the terminal apparatus 1, but, of course, the process in the present embodiment is the process in the terminal apparatus 1.

The present embodiment basically describes behavior (process) of the terminal apparatus 1, but, of course, the base station apparatus 3 performs similar behavior (process) correspondingly to the behavior (process) of the terminal apparatus 1.

Here, the transmission on the PUSCH (which may be transmission on the UL-SCH) is performed at a timing based on a System Frame Number (SFN) and the subframe. To be more specific, in order to specify the timing for the transmission on the PUSCH, the SFN and a subframe number/index in the radio frame corresponding to the SFN are needed. Here, the SFN is a number/index of a radio frame.

Hereinafter, for the purpose of simple description, the SFN (radio frame) and subframe transmitted on the PUSCH are also simply described as the subframe. In other words, the subframe in the following description may include the meanings of the SFN (radio frame) and subframe.

Here, the base station apparatus 3 may configure an interval (period) of the uplink semi-persistent scheduling for the terminal apparatus 1. For example, the base station apparatus 3 may transmit a first parameter for indicating a value of the interval of the uplink semi-persistent scheduling to the terminal apparatus 1 by including the parameters in higher layer signaling (RRC message).

For example, the base station apparatus 3 may use the first parameter to configure the interval value of the semi-persistent scheduling as 1 (1 subframe), 10 (10 subframes), 20 (20 subframes), 32 (32 subframe), 40 (40 subframes), 64 (64 subframes), 80 (80 subframes), 128 (128 subframes), 160 (160 subframes), 320 (320 subframes), and/or 640 (640 subframes). To be more specific, the base station apparatus 3 may use the first parameter to configure the interval value of the semi-persistent scheduling as 1 (1 subframe).

For example, the first parameter may be configured for each serving cell (the primary cell and/or the secondary cell). The first parameter may be configured for the primary cell. The interval value of the semi-persistent scheduling, "1 (1 subframe)", may be configured for each serving cell (the primary cell and/or the secondary cell).

The base station apparatus 3 may use the DCI format of the uplink (e.g., DCI format 0) to allocate a semi-persistent (semi-permanent, semi-persistent or periodical) PUSCH resource (physical resource block) to the terminal apparatus 1, and instruct the terminal apparatus 1 to activate the transmission on the semi-persistent PUSCH. The base station apparatus 3 may use the DCI format of the uplink to instruct the terminal apparatus 1 to release the semi-persistent PUSCH resource. Here, the DCI format of the uplink may include a CSI request field as described above.

For example, in a case that CRC parity bits attached to the DCI format are scrambled with the SPS C-RNTI, and a field of information of a New Data Indicator included within the DCI format is set to "0", the terminal apparatus 1 may verify (confirm, or check) whether multiple information fields included within the DCI format are set to specific values. To be more specific, the CRC parity bits attached to the DCI format scrambled with the SPS C-RNTI, and the field of the information of the New Data Indicator may be used for validation of the semi-persistent scheduling.

Here, in a case that the verification is succeeded, the terminal apparatus 1 may consider (recognize) that the received DCI format indicates a valid semi-persistent activation or a valid semi-persistent release. In a case that the verification is not succeeded, the terminal apparatus 1 may discard (clear) this DCI format.

Here, the semi-persistent activation may include the meaning of activation of the semi-persistent scheduling. The semi-persistent activation may also include the meaning of semi-persistent allocation of the PUSCH resource. The semi-persistent release may include the meaning of release of the semi-persistent scheduling.

To be more specific, the DCI format may be used to indicate the activation of semi-persistent uplink scheduling. The DCI format may be used to enable activation of the semi-persistent scheduling. The DCI format may be used to indicate the semi-persistent release.

FIGS. 3A and 3B are diagrams illustrating an example of Special fields for semi-persistent scheduling. FIG. 3A illustrates an example of special fields for activation of the semi-persistent scheduling. FIG. 3B illustrates an example of special fields for release of the semi-persistent scheduling. Hereinafter, the DCI including the special fields illustrated in FIG. 3A is also referred to as first DCI. The DCI including the special fields illustrated in FIG. 3B is also referred to as second DCI.

In other words, the first DCI may be DCI used to indicate activation of the semi-persistent scheduling. Here, the first DCI may be DCI used to indicate activation and/or reactivation of the semi-persistent scheduling. The second DCI may be DCI used to indicate activation of the semi-persistent scheduling.

Specifically, multiple fields may be defined (in the first DCI and/or second DCI) for activation and/or release of the semi-persistent scheduling. A prescribed value (that may be a specific value) set in each of multiple fields may be defined for activation and/or release of the semi-persistent scheduling.

For example, in a case that the DCI format of the uplink (e.g., DCI format 0) is used for activation of the semi-persistent scheduling, a field of information of the TPC command for the scheduled PUSCH included within the DCI format of the uplink may be set to "00", a field of information of the Cyclic shift DMRS may be set to "000", and the most significant bit (MSB) of a field of information of the Modulation and coding scheme (MCS) and redundancy version may be set to "0".

For example, in a case that the uplink DCI format (e.g., DCI format 0) is used for release of the semi-persistent scheduling, the field of the information on the TPC command for the scheduled PUSCH included within the uplink DCI format may be set to "00", the field of the information on the Cyclic shift DMRS may be set to "000", the most significant bit (MSB) of the field of the information on the Modulation and coding scheme (MCS) and redundancy version may be set to "11111", and a field of information on Resource block assignment and hopping resource allocation (that may be all fields of multiple fields) may be set to "1".

In other words, in a case that each of multiple information fields included within the DCI format for the uplink is set to a specific value defined in advance, the terminal apparatus 1 may activate the semi-persistent scheduling. In the case that each of multiple information fields included within the DCI format is set to a specific value defined in advance, the terminal apparatus 1 may release the semi-persistent scheduling.

Here, multiple information fields and prescribed values to which the information fields are set which are used for activation and/or release of the semi-persistent scheduling are not limited to the examples described above, of course. For example, multiple information fields and prescribed values to which the information fields are set which are used for activation and/or release of the semi-persistent scheduling may be defined by specification or the like in advance to be used as information known to both the base station apparatus 3 and the terminal apparatus 1.

In other words, in a case that the DCI format of the uplink is used for release of the semi-persistent scheduling, the field associated with the resource block assignment (resource allocation) may be set to a value defined in advance for release.

Here, the terminal apparatus 1 has to have a valid uplink grant for performing the transmission on the UL-SCH (transmission on the UL-SCH via the PUSCH, and/or UL-SCH transmission on the PUSCH). Here, the uplink grant may include the meaning that uplink transmission in a certain subframe is granted (permitted, or given).

For example, the valid uplink grant may be dynamically received on the PDCCH. To be more specific, the valid uplink grant may be indicated using the DCI format to which the CRC parity bits scrambled with the C-RNTI are attached. The valid uplink grant may be semi-permanently configured. To be more specific, the valid uplink grant may be indicated using the DCI format to which the CRC parity bits scrambled with the SPS C-RNTI are attached.

The terminal apparatus 1 may store the uplink grant dynamically received on the PDCCH and/or the semi-permanently configured uplink grant. Here, the HARQ entity may deliver the uplink grant dynamically received on the PDCCH and/or the semi-permanently configured uplink grant to a HARQ process, and the HARQ process may store the uplink grant received from the HARQ entity. Hereinafter, the uplink grant dynamically received on the PDCCH and/or semi-permanently configured uplink grant which are to be stored are referred to as a stored uplink grant.

In the case of being instructed to perform the semi-persistent activation, the terminal apparatus 1 (MAC entity) may store the DCI format received from the base station apparatus 3 as a configured uplink grant. Here, the configured uplink grant may be referred to as a configured semi-persistent scheduling UpLink grant (SPS UL grant), or a configured grant. The configured uplink grant may be referred to as a configured uplink grant, a configured semi-persistent scheduling uplink grant (SPS UL grant), or a configured grant.

Here, based on that the uplink grant (SPS UL grant) stored by the MAC entity is cleared, the uplink grant (SPS UL grant) stored by the HARQ process may not be cleared. To be more specific, even in a case that the uplink grant (SPS UL grant) stored by the MAC entity is cleared, retransmission on the semi-persistent PUSCH can be continued based on the uplink grant (SPS UL grant) stored by the HARQ process.

The semi-persistent scheduling uplink grant may be referred to as a SPS uplink grant, a Semi-Persistent grant, and a Semi-persistent scheduling assignment.

The base station apparatus 3 may configure validation and/or invalidation of the semi-persistent scheduling for the terminal apparatus 1. For example, the base station apparatus 3 may configure validation and/or invalidation of the semi-persistent scheduling by using higher layer signaling (e.g., RRC layer signaling).

For example, the terminal apparatus 1 starts transmission of a certain subframe on the semi-persistent PUSCH, and then, may initialize or reinitialize the configured uplink grant such that the transmission on the semi-persistent PUSCH recurs based on Equation (1). To be more specific, the terminal apparatus 1 may sequentially consider that the configured uplink grant occurs in a subframe satisfying Equation (1).

$$(10*SFN+\text{subframe}) = [(10*SFN_{non\_time} + \text{subframe}_{start\_time}) + N*semiPersistSchedIntervalUL + \text{Subframe\_Offset}*(N \bmod 2)] \bmod 10240 \quad \text{Equation (1)}$$

In other words, the terminal apparatus 1, after configuring the SPS uplink grant, may set a value of Subframe_Offset, and consider (consider sequentially) that the N-th grant (configured uplink grant, SPS uplink grant) occurs in the subframe specified based on Equation (1).

Here, the subframe satisfying Equation (1) is also referred to as a subframe satisfying a prescribed condition. The subframes among the subframes satisfying Equation (1) except for the first subframe are also referred to as subframes satisfying a prescribed condition. Here, the first subframe among the subframes satisfying Equation (1) may be a subframe receiving the first DCI.

Specifically, the terminal apparatus 1 may specify the subframe for the transmission on the PUSCH corresponding to the N-th configured uplink grant, based on Equation (1), after configuring the stored DCI format as the SPS uplink grant. Here, in Equation (1), SEN and subframe represent the SFN and subframe, respectively, transmitted on the PUSCH.

In Equation (1), $SFN_{start-time}$ and $\text{subframe}_{start-time}$ represent the SFN and subframe, respectively, at the time when the configured uplink grants are initialized or reinitialized. To be more specific, $SFN_{start-time}$ and $\text{subframe}_{start-time}$ represent, respectively, the SFN and subframe starting the transmission on the PUSCH based on the configured uplink grant (i.e., the subframe for an initial transmission on the PUSCH corresponding to the 0-th configured uplink grant).

In Equation (1), semiPersistSchedIntervalUL represents the interval of the uplink semi-persistent scheduling. In Equation (1), Subframe_Offset represents an offset value used to specify the subframe for the transmission on the PUSCH.

Here, the terminal apparatus 1 may set Subframe_Offset in Equation (1) to "0" in a case that a parameter (twoIntervalConfig) is not validated by higher layer after configuring the SPS uplink grant.

The initialization may be performed in a case that the semi-persistent scheduling is not activated. The reinitialization may be performed in a case that the semi-persistent scheduling is already activated. Here, the initialization may include the meaning of initial configuration, and the reinitialization may include the meaning of re-initial configuration. In other words, the terminal apparatus 1 may initialize or reinitialize the configured uplink grant to start the transmission on the PUSCH in a certain subframe.

Figure 4:
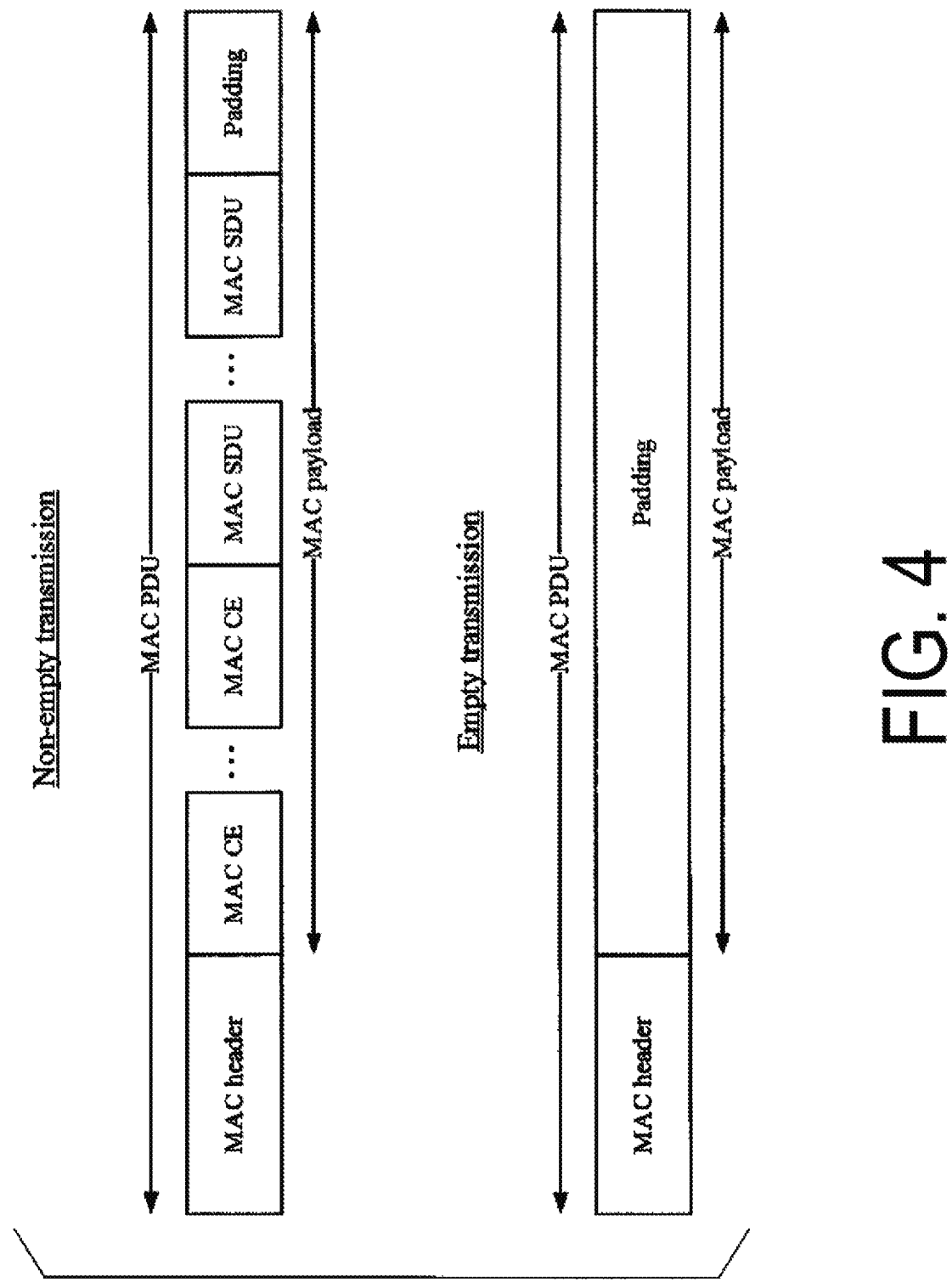
FIG. 4 is a diagram illustrating examples of non-empty transmission and empty transmission according to the present embodiment.

FIG. 4 is a diagram illustrating examples of Non-empty transmission and Empty transmission. As illustrated in FIG. 4, a MAC protocol Data Unit (MAC PDU) may be constituted by a MAC header, a MAC Service Data Unit (MAC SDU), a MAC Control Element (MAC CE), and padding (padding bits). Here, the MAC protocol data unit may correspond to the uplink data (UL-SCH).

Here, multiple MAC control elements including at least the MAC control element described later may be defined as MAC control elements. For example, a Buffer Status Report MAC CE (BSR MAC CE: MAC control element used for a buffer status report) may be defined as a MAC control element. A Timing Advance Command MAC CE (TAC MAC CE: MAC control element used to transmit a timing advance command) may be defined as a MAC control element.

A Power Headroom Report MAC CE (PHR MAC CE: MAC control element used for a power headroom report) may be defined as a MAC control element. An Activation/Deactivation MAC CE (MAC control element used to transmit an activation/deactivation command) may be defined as a MAC control element.

Multiple buffer status reports including at least a Regular BSR, a Periodic BSR, and a padding BSR may be defined as the buffer status report. For example, the Regular BSR, the Periodic BSR, and the padding BSR may be triggered based on events (conditions) different from each other.

For example, the Regular BSR may be triggered in a case that data for a logical channel which belongs to a certain Logical Channel Group (LCG) becomes available for transmission, and priority for the transmission of the data is higher than the logical channels which belong to any LCG and for which data is already available for transmission, or in a case that there is no available data for transmission on the logical channels which belong to any LCG. The Regular BSR may also be triggered in a case that a prescribed timer (retx BSR-Timer) expires, and the terminal apparatus 1 has available data for transmission for the logical channels which belong to a certain LCG.

The Periodic BSR may be triggered in a case that a prescribed timer (periodic BSR-Timer) expires. The padding BSR may be triggered in a case that the UL-SCH is allocated, and the number of padding bits is equal to or larger than a size of the Buffer Status Report MAC control element plus its subheader.

The terminal apparatus 1 may use the buffer status report to notify the base station apparatus 3 of a transmission data buffer size of the uplink data corresponding to each LCG as a message in the MAC layer.

As illustrated in FIG. 4, the MAC protocol data unit may contain zero, one, or multiple MAC service data units. The MAC protocol data unit may contain zero, one, or multiple MAC control elements. Padding may occur at the end of the MAC Protocol Data Unit (MAC PDU).

Here, the non-empty transmission may be transmission of the MAC protocol data unit including at least one or multiple MAC service data units (or may correspond to transmission of MAC protocol data unit including at least one or multiple MAC service data units).

The non-empty transmission may be transmission of the MAC protocol data unit including at least one or multiple first MAC control elements (or may correspond to transmission of the MAC protocol data unit including at least one or multiple first MAC control elements). Here, the first MAC control element (or a first prescribed MAC control element) may be defined in advance by specifications or the like, and may be information known to both the base station apparatus 3 and the terminal apparatus 1.

For example, the first MAC control element may contain one or all of the multiple MAC control elements described above. For example, the first MAC control element may be a power headroom report MAC control element. The first MAC control element may be a buffer status report MAC control element including a regular BSR. The first MAC control element may be a buffer status report MAC control element including a periodic BSR.

To be more specific, the non-empty transmission may be transmission of the MAC protocol data unit including one or multiple MAC service data units and/or one or multiple first MAC control elements (or may correspond to transmission of the MAC protocol data unit including at least one or multiple MAC service data units and/or one or multiple first MAC control elements).

The empty transmission may be transmission of the MAC protocol data unit including only padding (or may correspond to transmission of the MAC protocol data unit including only padding). Here, the MAC header may be attached to the transmission of the MAC protocol data unit including only padding.

The empty transmission may be transmission of the MAC protocol data unit including one or multiple second MAC control elements (or may correspond to transmission of the MAC protocol data unit including at least one or multiple second MAC control elements). Here, the second MAC control element (or a second prescribed MAC control element) may be defined in advance by specifications or the like, and may be information known to both the base station apparatus 3 and the terminal apparatus 1.

Here, the second MAC control element may be a MAC control element other than the first MAC control element. For example, the second MAC control element may contain one or all of the multiple MAC control elements described above. For example, the second MAC control element may be a buffer status report MAC control including a padding BSR.

To be more specific, the empty transmission may be transmission of the MAC protocol data unit including padding and/or only one or multiple second MAC control elements (or may correspond to transmission of the MAC protocol data unit including only padding and/or one or multiple second MAC control elements).

Here, the non-empty transmission and/or the empty transmission may be transmission corresponding to a new transmission. To be more specific, transmitting, in the new transmission, the MAC protocol data unit including at least one or multiple MAC service data units and/or one or multiple first MAC control elements may be referred to as the non-empty transmission. Transmitting, in the new transmission, the MAC protocol data unit including only padding and/or one or multiple second MAC control elements may be referred to as the empty transmission.

The non-empty transmission and/or the empty transmission may be performed on the PUSCH scheduled by the base station apparatus 3. For example, the non-empty transmission and/or the empty transmission may be performed on the PUSCH scheduled by using the DCI (DCI format) to which the CRC parity bits scrambled with the C-RNTI are attached dynamically scheduled PUSCH resource). The non-empty transmission and/or the empty transmission may be performed on the PUSCH scheduled by using the DCI (DCI format) to which the CRC parity bits scrambled with the SPS C-RNTI are attached semi-permanently scheduled PUSCH resource).

As described above, the terminal apparatus 1 may semi-permanently (semi-persistently or periodically) perform the transmission on the PUSCH (transmission on the UL-SCH) in the subframe specified based on Equation (1). Here, the terminal apparatus 1 may clear the configured grant based on a second parameter (parameter for indicating the Number of empty transmissions before release) configured by the base station apparatus 3.

For example, the terminal apparatus 1 may clear the configured grant in a case that the number of consecutive empty transmissions corresponding to the initial transmission on the semi-persistent PUSCH reaches a value indicated by using the second parameter (the number of transmissions).

To be more specific, the terminal apparatus 1 may clear the configured grant immediately after the second parameter corresponding to the number of consecutive new MAC Protocol Data Units (PDUs) each of which contains no MAC service data unit (i.e., each of which contains zero MAC SDUs) (may clear the configured grant immediately after the third parameter the number of consecutive new MAC PDUs each contains zero MAC SDUs). Here, the number of the consecutive empty transmissions corresponding to the initial transmission may include the number of empty transmissions on the semi-persistent scheduling resource. Here, the number of the consecutive empty transmissions corresponding to the initial transmission may not include the number of empty transmissions on the dynamically scheduled PUSCH resource.

Here, the terminal apparatus 1 may release (clear) the uplink resource allocated by the base station apparatus 3 (semi-persistent scheduling resource, PUSCH resource), based on the second parameter. Specifically, the terminal apparatus 1 may release the uplink resource allocated by the base station apparatus 3 similarly to clearing the configured grant, based on the second parameter. Here, the terminal apparatus 1, in a case of receiving the DCI format which is used to indicate the release of the semi-persistent scheduling described above, may clear the configured grant and/or release the uplink resource.

Hereinafter, a first behavior refers to a behavior in which the terminal apparatus 1 transmits the uplink data, and clears the configured grant and/or releases the uplink resource, based on the second parameter as described above. The first behavior also refers to a behavior in which the terminal apparatus 1 transmits the uplink data, and clears the configured grant and/or releases the uplink resource in the case of receiving the DCI format which is used to indicate the release of the semi-persistent scheduling as described above.

Here, in the first behavior, the terminal apparatus 1 immediately clears the configured grant and/or releases the uplink resource in the case of receiving the DCI format which is used to indicate the release of the semi-persistent scheduling. To be more specific, the terminal apparatus 1 immediately clears the configured grant and/or releases the uplink resource without transmitting any information to the base station 3 in the case of receiving the DCI format which is used to indicate the release of the semi-persistent scheduling.

Figure 5:
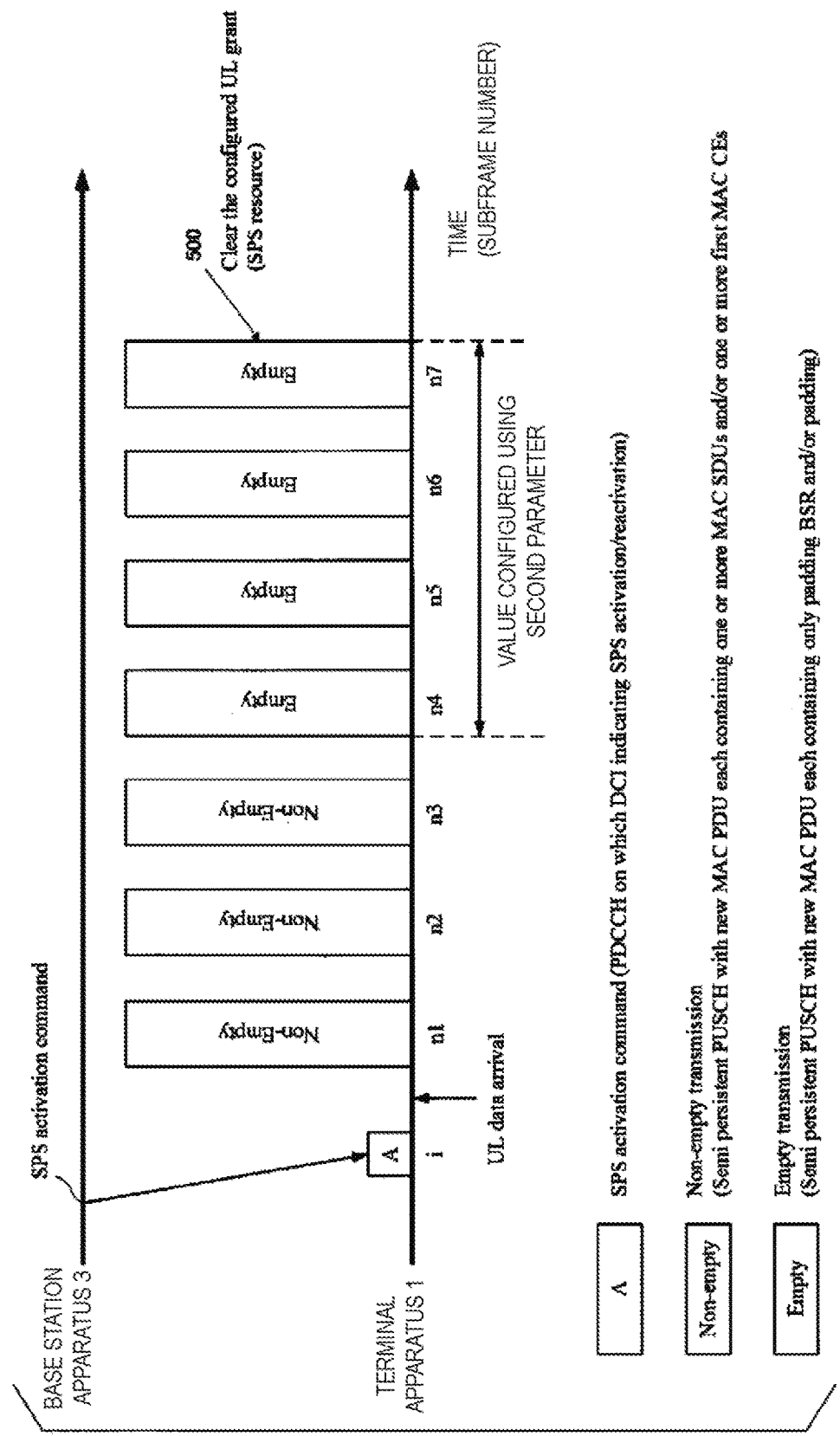
FIG. 5 is a diagram illustrating an example of a method for transmission in uplink according to the present embodiment.

FIG. 5 is a diagram illustrating an example of the method for transmission in uplink according to the present embodiment. Here, FIG. 5 may illustrate the method for transmission (method for process) in the first behavior. FIG. 5 illustrates a behavior as an example in a case that the interval value of the semi-persistent scheduling is configured to be "1 (1 subframe)". The transmission illustrated in FIG. 5 represents, as an example, the transmission on the semi-persistent scheduling resource.

In a subframe i, the terminal apparatus 1 may receive the first DCI (the DCI (DCI format, uplink grant, SPS activation command) used to indicate the activation and/or reactivation of the semi-persistent scheduling). Here, the terminal apparatus 1 may perform the non-empty transmission in a subframe corresponding to the subframe in which the first DCI is received (e.g., a subframe 4 subframes after the subframe i, for example, a subframe n1). Here, in the subframe n1, the terminal apparatus 1 may perform the empty transmission.

To be more specific, the terminal apparatus 1 may perform the non-empty transmission based on the configured uplink grant according to Equation (1) described above. Specifically, the terminal apparatus 1 may perform the non-empty transmission on the semi-persistent scheduling resource in the case of having available data for transmission. The terminal apparatus 1 may perform the empty transmission on the semi-persistent scheduling resource in the case of having no available data for transmission. Similarly, the terminal apparatus 1 may perform the non-empty transmission and/or empty transmission in a subframe n2, a subframe 3, a subframe 4, a subframe 5, subframe 6 and/or a subframe 7.

Here, the case of having available data for transmission may include (i) a case that "not only padding BSR is available for transmission", or (ii) a case that "not only padding BSR and/or padding is (are) available for transmission". Specifically, the case of having available data for transmission may include a case that not only padding BSR is in a state available for transmission. Moreover, specifically, the case of having available data for transmission may include a case that not only padding BSR and/or padding is (are) in a state available for transmission.

Here, the padding BSR may be the second MAC control element. Specifically, the padding BSR may be a buffer status report MAC control element including a padding BSR.

The case of having no available data for transmission may include (i) a case that "only padding BSR is available for transmission", or (ii) a case that "only padding BSR and/or padding is (are) available for transmission".

Here, as described later, the case of having no available data for transmission may include (iii) a case that "only padding BSR is available for transmission, except for a case that the CSI request field is set to trigger a report", or (iv) a case that "only padding BSR and/or padding is (are) available for transmission, except for a case that the CSI request field is set to trigger a report".

As described above, the terminal apparatus 1 may clear the configured grant (indicated by a numeral 500 in FIG. 5) in a case that the number of consecutive empty transmissions on the semi-persistent scheduling resource reaches the value configured by using the second parameter (the number of transmissions). The terminal apparatus 1 may release the uplink resource (semi-persistent scheduling resource) in the case that the number of consecutive empty transmissions on the semi-persistent scheduling resource reaches the value configured by using the second parameter (the number of transmissions). Specifically, the terminal apparatus 1 may clear the configured grant and/or release the uplink resource, based on the second parameter.

For example, in a subframe i+x, the terminal apparatus 1 may receive the second DCI (the DCI (DCI format, uplink grant, SPS release command) which is used to indicate the release of the semi-persistent scheduling). As described above, the terminal apparatus 1, in a case of receiving the second DCI, may immediately clear the configured grant and/or release the uplink resource. To be more specific, the terminal apparatus 1 may immediately clear the configured grant and/or release the uplink resource without transmitting any information to the base station 3 in the case of receiving the second DC1 format.

Figure 6:
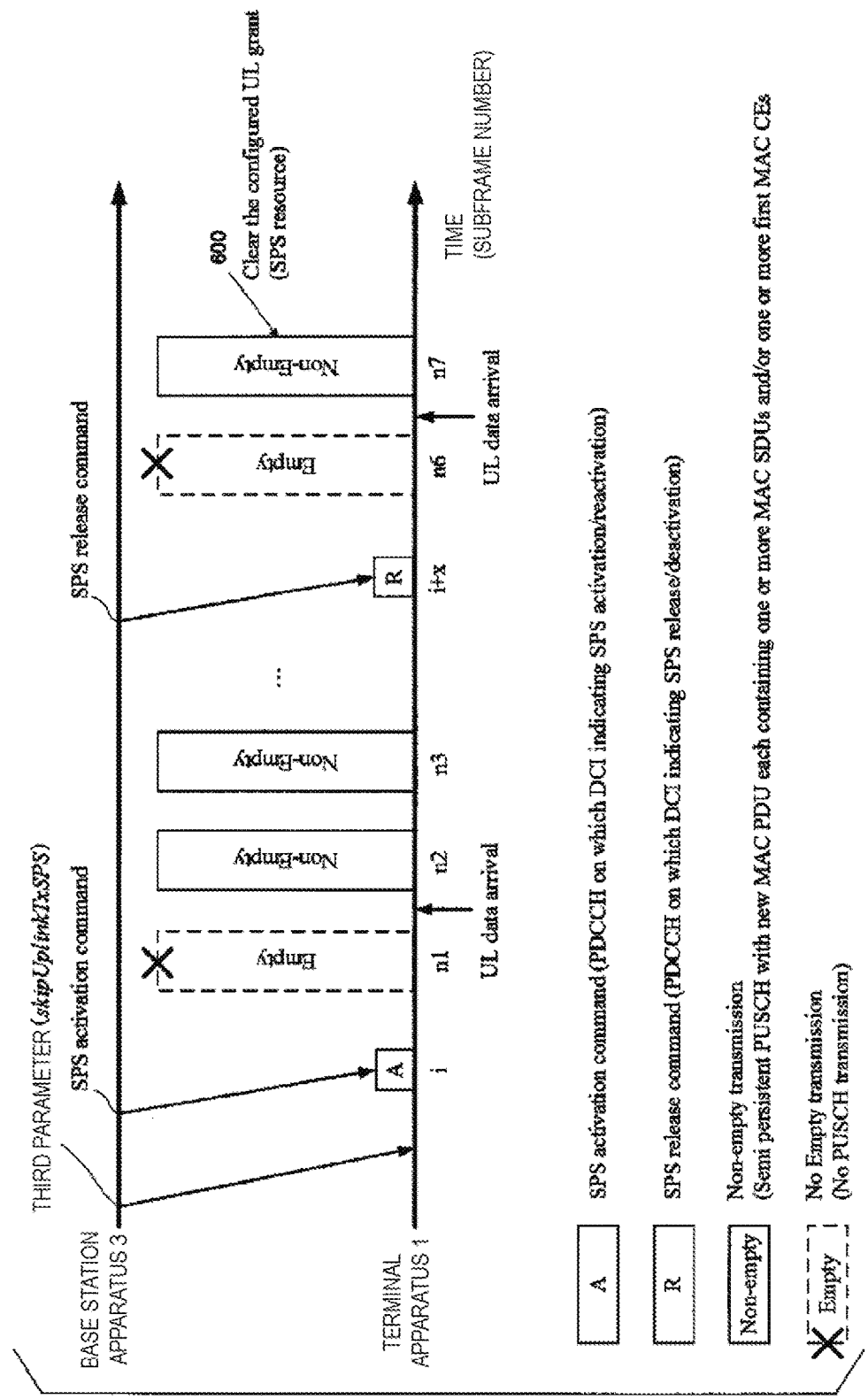
FIG. 6 is another diagram illustrating an example of the method for transmission in uplink according to the present embodiment.

FIG. 6 is another diagram for describing a method for transmission in uplink according to the present embodiment. Hereinafter, a behavior described with reference to FIG. 6 is also referred to as a second behavior. Here, FIG. 6 illustrates a behavior as an example in a case that the interval value of the semi-persistent scheduling is configured to be "1 (1 subframe)". The transmission illustrated in FIG. 6 represents, as an example, the transmission on the semi-persistent scheduling resource.

Here, the base station apparatus 3 may transmit a third parameter (also referred to as skipUplinkTxSPS) to the terminal apparatus 1. For example, the base station apparatus 3 may transmit the third parameter by using higher layer signaling (e.g., signaling in the RRC layer). For example, the third parameter may include a parameter used to configure to perform the second behavior (which may be a partial behavior included in the second behavior). The third parameter may include a parameter used to configure the interval value of the uplink semi-persistent scheduling "1 (1 subframe)".

The third parameter may include a parameter used to configure whether the empty transmission is performed on the semi-persistent scheduling resource (that is, configure to perform or not to perform the transmission). The third parameter may include a parameter used to configure whether the non-empty transmission is performed on the semi-persistent scheduling resource (that is, configure to perform or not to perform the transmission).

To be more specific, the terminal apparatus 1 may switch between the first behavior and the second behavior, based on the third parameter transmitted by the base station apparatus 3 (e.g., a parameter in the higher layer or a parameter in the RRC layer). For example, the terminal apparatus 1 may perform the first behavior in a case of not being configured with the third parameter, and perform the second behavior in a case of being configured with the third parameter.

In the subframe i, the terminal apparatus 1 may receive the first DCI. Here, the terminal apparatus 1 does not perform the empty transmission in a subframe corresponding to the subframe in which the first DCI is received (e.g., a subframe 4 subframes after the subframe i, for example, a subframe n1). The terminal apparatus 1 may perform the non-empty transmission in the subframe n1.

Specifically, in the subframe n1, the terminal apparatus 1 having no available data for transmission does not perform the empty transmission. Specifically, the terminal apparatus 1 skips the empty transmission. In other words, the terminal apparatus 1 may skip the uplink grant (the configured grant). Specifically, the terminal apparatus 1 may skip the transmission in uplink. In the subframe n1, the terminal apparatus 1 having available data for transmission may perform the non-empty transmission.

In other words, the terminal apparatus 1 configured with the third parameter does not perform the empty transmission in the case of having no available data for transmission. As described above, the terminal apparatus 1 not configured with the third parameter performs the empty transmission in the case of having no available data for transmission. To be more specific, the terminal apparatus 1 may switch whether to perform the empty transmission, based on the third parameter, in the case of having no available data for transmission.

Here, in the subframe n1, the terminal apparatus 1 may always perform the non-empty transmission or the empty transmission in a case of transmission corresponding to the DCI (the DCI format, the uplink grant) to which the CRC parity bits scrambled with the C-RNTI are attached. In other words, in a case that a PUSCH resource is scheduled by using the DCI to which the CRC parity bits scrambled with the C-RNTI are attached, the terminal apparatus 1 may always perform the non-empty transmission or the empty transmission on the scheduled PUSCH resource.

To be more specific, a resource scheduled by using the DC1 to which the CRC parity bits scrambled with the C-RNTI are attached (dynamically scheduled resource) may override a resource scheduled by using the DCI to which the CRC parity bits scrambled with the SPS C-RNTI are attached (semi-permanently scheduled resource).

Similarly, in the subframe n2 and/or subframe n3, the terminal apparatus 1 having available data for transmission may perform the non-empty transmission. In the subframe n2 and/or the subframe 3, the terminal apparatus 1 having no available data for transmission may not perform the empty transmission. In other words, the terminal apparatus 1 having available data for transmission does not perform the transmission of only the padding BSR and/or padding.

Specifically, the terminal apparatus 1 which is configured with the third parameter, has the available data for transmission, and is given the uplink grant corresponding to the semi-persistent scheduling may perform the non-empty transmission. The terminal apparatus 1 which is configured with the third parameter, has no available data for transmission, and is given the uplink grant corresponding to the semi-persistent scheduling may not perform the empty transmission.

The terminal apparatus 1 which has the available data for transmission and is given the uplink grant corresponding to the dynamic scheduling may perform the non-empty transmission regardless of being configured with the third parameter. The terminal apparatus 1 which has no available data for transmission and is given the uplink grant corresponding to the dynamic scheduling may perform the empty transmission regardless of being configured with the third parameter.

In the subframe i+x, the terminal apparatus 1 may receive the second DCI. Here, the terminal apparatus 1 in the case of having no available data for transmission may not perform the empty transmission in a subframe corresponding to the subframe in which the second DCI is received (e.g., a subframe 4 subframes after the subframe i+x, for example, a subframe n6).

In the subframe n7, the terminal apparatus 1 having available data for transmission may perform the non-empty transmission. In other words, the terminal apparatus 1 having available data for transmission does not perform the transmission of only the padding BSR and/or padding. Here, the terminal apparatus 1 in the case of receiving the second DCI may perform the non-empty transmission on the PUSCH (PUSCH resource) scheduled using the most recent DCI (a most recent first DCI) which is used to indicate the activation and/or deactivation of the semi-persistent scheduling. Here, the most recent first DCI is also referred to as a last received first DCI.

In other words, the terminal apparatus 1 in the case of having available data for transmission may perform the non-empty transmission on the PUSCH (PUSCH resource) scheduled by using the configured grant which is stored. To be more specific, in the subframe n7, the terminal apparatus 1 having available data for transmission may perform the non-empty transmission based on the configured grant.

As described above, the field associated with the resource block assignment (resource allocation) in the second DCI may be set to a value defined in advance for the release of the semi-persistent scheduling. Therefore, the terminal apparatus 1 may perform the non-empty transmission, based on the configured grant in the case of receiving the second DCI.

In other words, the terminal apparatus 1 may perform the non-empty transmission, based on the configured grant in the case of receiving the second DCI. To be more specific, the terminal apparatus 1 may perform the non-empty transmission on the PUSCH (PUSCH resource) before the release of the PUSCH (PUSCH resource) in the case of receiving the second DCI. Here, the PUSCH (PUSCH resource) is scheduled using the most recent first DCI. Specifically, the PUSCH (PUSCH resource) is scheduled by using the configured grant.

The terminal apparatus 1 may clear the configured grant and/or release the uplink resource in a subframe in which the non-empty transmission is performed or in subframes after the subframe in which the non-empty transmission is performed (indicated by a numeral 600 in FIG. 6). Specifically, the terminal apparatus 1 configured with the third parameter, in the case of receiving the second DCI, may perform the non-empty transmission, and clear the configured grant and/or release the uplink resource.

The terminal apparatus 1 may clear the configured grant and/or release the uplink resource in a subframe in which the second DCI is received or in subframes after the subframe in which the second DCI is received.

That is, the terminal apparatus 1 configured with the third parameter, in the case of receiving the second DCI, may deliver the configured grant to the HARQ entity, and thereafter, may clear the configured grant anchor release the uplink resource in a subframe in which the second DCI is received or in subframes after the subframe in which the second DCI is received.

As describe above, the terminal apparatus 1 not configured with the third parameter, in the case of receiving the second DCI, clears the configured grant and/or releases the uplink resource without transmitting any information to the base station 3. That is, the terminal apparatus 1 in the case of receiving the second DCI, based on the third parameter, may perform the non-empty transmission, and thereafter, may switch whether to clear the configured grant and/or release the uplink resource, or to clear the configured grant and/or release the uplink resource without transmitting any information to the base station 3.

Here, in the subframe n6 and/or subframe n7, the terminal apparatus 1 may transmit an acknowledgement response (information indicating ACK or NACK, also referred to as SPS confirmation) for the second DCI. For example, the terminal apparatus 1 may trigger SPS confirmation (an acknowledgement response for the first DCI and/or second DCI) at the time of being configured with the third parameter, and may transmit the SPS confirmation for the second DCI on the PUSCH in the case of receiving the second DCI. Specifically, the terminal apparatus 1 may clear the configured grant and/or release the uplink resource (semi-persistent scheduling resource) immediately after transmitting the SPS confirmation. Here, the terminal apparatus 1 may release the uplink resource (semi-persistent scheduling resource) after transmitting the SPS confirmation, and immediately thereafter, may clear the configured grant.

Specifically, the terminal apparatus 1 may transmit, on the PUSCH, the SPS confirmation for the second DCI transmitted on the PDCCH. The terminal apparatus 1 may perform the non-empty transmission including the SPS confirmation for the second. DCI. Specifically, the terminal apparatus 1 may not transmit an acknowledgement response for the PDSCH (downlink data) but transmit, on the PUSCH, the SPS confirmation for the second DCI transmitted on the PDCCH.

As described above, the terminal apparatus 1 configured with the third parameter and having no available data for transmission does not perform the empty transmission. Specifically, in a case that the third parameter is configured and only the second MAC control element is available for transmission, the terminal apparatus 1 does not perform the empty transmission. In a case that the third parameter is configured and only the second MAC control element and/or padding is (are) available for transmission, the terminal apparatus 1 does not perform the empty transmission.

To be more specific, not performing the empty transmission may be defined as the behavior (process) in the first entity, the HARQ entity and/or the HARQ process in the terminal apparatus 1. In other words, performing the non-empty transmission, not performing the non-empty transmission, performing the empty transmission, and/or not performing the empty transmission may be defined as the behavior (process) in the first entity, the HARQ entity and/or the HARQ process in the terminal apparatus 1.

For example, it may be defined that whether or not the MAC protocol data unit to transmit (the MAC PDU to transmit) is obtained from the first entity is determined based on whether the HARQ entity has available data for transmission. For example, in a case that the HARQ entity has available data for transmission, the HARQ entity may obtain the MAC protocol data unit to transmit (the MAC PDU to transmit), from the first entity. That is, in a case that the HARQ entity has no available data for transmission, the HARQ entity may not obtain the MAC protocol data unit to transmit, from the first entity.

In a case that the third parameter is configured, the uplink grant is addressed to the SPS C-RNTI, and the HARQ entity has available data for transmission, it may be defined that the HARQ entity obtains the MAC protocol data unit from the first entity. That is, in a case that the third parameter is configured, the uplink grant is addressed to the SPS C-RNTI, and the HARQ entity has no available data for transmission, the HARQ entity may not obtain the MAC protocol data unit from the first entity. The MAC protocol data unit may contain one or multiple first MAC control elements and/or one or multiple MAC service data units.

Here, in a case that the MAC protocol data unit to transmit is obtained, a trigger for initial transmission may be indicated to the HARQ process. Specifically, in this case, the non-empty transmission may be performed. Specifically, in this case, the uplink transmission may be performed. For example, in the case that the MAC protocol data unit to transmit is obtained, the HARQ entity may deliver the MAC PDU and the configured grant to the HARQ process and indicate the trigger for initial transmission to the HARQ process. Here, for example, the HARQ process may store the configured grand and indicate generation of the transmission according to the stored uplink grant to a physical layer.

Here, the aperiodic CSI report (aperiodic CSI reporting) may be generated (performed) in the physical layer. For example, in a case that the MAC protocol data unit to transmit (transport block, uplink data) is obtained, and the generation of the transmission according to the stored uplink grant is indicated, the aperiodic CSI report may be generated in the physical layer, and the MAC PDU (transport block, uplink data) may be transmitted along with the aperiodic CSI report on the PUSCH. Here, in a case that the empty transmission is skipped by the terminal apparatus 1, the aperiodic CSI report may be dropped (that is, the aperiodic CSI report may not be performed).

In the case that the MAC protocol data unit is not obtained, the HARQ entity may not deliver the MAC protocol data unit and the configured grant to the HARQ process and may not indicate the trigger for initial transmission to the HARQ process. Specifically, in this case, the empty transmission may not be performed.

Here, the first entity may supply the MAC protocol data unit to transmit to transmit. A Logical Channel Prioritization procedure in a case that the new transmission is performed may be applied to the first entity. The first entity may multiplex the MAC control elements and the MAC service data units.

For example, in a case that the empty transmission is not performed, the first entity may not generate a MAC protocol data unit corresponding to the empty transmission. In the case that the empty transmission is not performed, the first entity may not deliver a MAC protocol data unit corresponding to the empty transmission to the HARQ entity.

In the case that the empty transmission is not performed, the HARQ entity may not deliver a MAC protocol data unit corresponding to the empty transmission to the HARQ process. In the case that the empty transmission is not performed, the HARQ process may not deliver a MAC protocol data unit corresponding to the empty transmission to the physical layer.

For example, it may be defined that in a case that the MAC entity is configured with the third parameter, has available data for transmission, and is given the uplink grant corresponding to the semi-persistent scheduling, the MAC entity transmits the MAC protocol data unit including one or multiple MAC service data units. For example, in this case, the HARQ entity may obtain the MAC protocol data unit to transmit (the MAC PDU to transmit), from the first entity.

It may be also defined that in the case the MAC entity is configured with the third parameter, has available data for transmission, and is given the uplink grant corresponding to the semi-persistent scheduling, the MAC entity transmits the MAC protocol data unit including one or multiple first MAC control elements. For example, in this case, the HARQ entity may obtain the MAC protocol data unit to transmit (the MAC PDU to transmit), from the first entity.

That is, it may be defined that in the case the MAC entity is configured with the third parameter, has available data for transmission, and is given the uplink grant corresponding to the semi-persistent scheduling, the MAC entity transmits the MAC protocol data unit including one or multiple MAC service data units and/or one or multiple first MAC control elements. For example, in this case, the HARQ entity may obtain the MAC protocol data unit to transmit (the MAC PDU to transmit), from the first entity.

It may be defined that in the case the MAC entity is configured with the third parameter, has data available for transmission, and is given the uplink grant corresponding to the semi-persistent scheduling, the MAC entity does not transmit the MAC protocol data unit including only padding BSR and/or only padding.

Specifically, it may be defined that in the case the MAC entity is configured with the third parameter, has available data for transmission, and is given the uplink grant corresponding to the semi-persistent scheduling, the MAC entity does not transmit the MAC protocol data unit including only one or multiple second MAC control elements and/or only padding.

Figure 7:
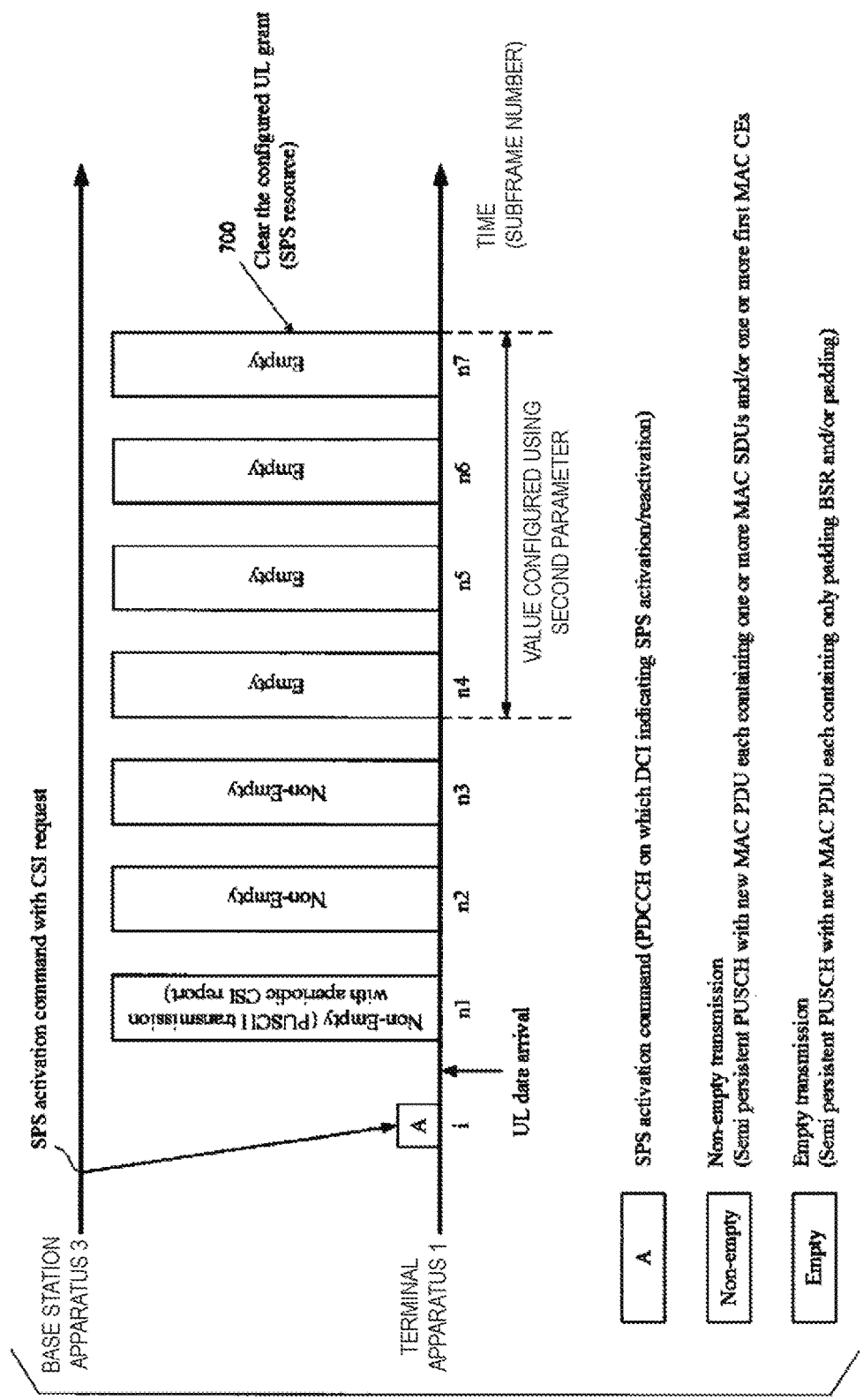
FIG. 7 is another diagram illustrating an example of the method for transmission in uplink according to the present embodiment.

FIG. 7 is another diagram illustrating an example of the method for transmission in uplink according to the present embodiment. Here, FIG. 7 may illustrate the method for transmission (method for process) in the first behavior. Specifically, FIG. 7 may correspond to FIG. 5. Specifically, FIG. 7 may illustrate a behavior of the terminal apparatus 1 in the case that the third parameter is not configured.

In the subframe i, the terminal apparatus 1 may receive the first DCI. Here, the first DCI may include a CSI request field. Specifically, the base station apparatus 3 may trigger the CSI transmission (aperiodic CSI report) using the PUSCH by setting such that a report is triggered using a CSI request field included in the first DCI.

Here, the terminal apparatus 1, in a case of receiving the first DCI including the CSI request field which is set to trigger a report, may transmit the CSI using the PUSCH (may perform the aperiodic CSI reporting) in a subframe corresponding to the subframe (e.g., a subframe 4 subframes after the subframe i, for example, a subframe n1).

Specifically, the terminal apparatus 1, in the case of receiving the first DCI including the CSI request field which is set to trigger a report, may always (inevitably) perform the aperiodic CSI reporting. Specifically, the terminal apparatus 1 may always perform the aperiodic CSI reporting in the first subframe (subframe n1) corresponding to a subframe in which received is the DCI including the CSI request field which is set to trigger a report. Specifically, the terminal apparatus 1, in the case of receiving the DCI including the CSI request field which is set to trigger a report, may always perform the aperiodic CSI reporting using the first PUSCH resource (the first semi-persistent scheduling resource).

Specifically, in a case that the first DCI including the CSI request field which is set to trigger a report indicates the uplink transmission based on the configured uplink grant (the uplink transmission considered to consecutively occur) according to Equation (1) described above, the terminal apparatus 1 may perform the aperiodic CSI reporting in the first uplink transmission (a subframe in which the first uplink transmission is performed).

Here, the terminal apparatus 1, in a case of receiving the first DCI including the CSI request field which is set not to trigger a report (the CSI request field which is not set to trigger a report), may perform the non-empty transmission and/or the empty transmission in the subframe n1. Specifically, in the subframe n1, the terminal apparatus 1 having available data for transmission may perform the non-empty transmission. In the subframe n1, the terminal apparatus 1 having no available data for transmission may perform the empty transmission.

In the subframe the terminal apparatus 1 may receive the second DCI. Here, the second DCI may include a CSI request field. Specifically, the base station apparatus 3 may trigger the CSI transmission (aperiodic CSI report) using the PUSCH by setting such that a report is triggered using a CSI request field included in the second DCI.

As described above, the terminal apparatus 1 not configured with the third parameter, in the case of receiving the second DCI, may immediately clear the configured grant and/or release the uplink resource without transmitting any information to the base station 3. Specifically, the terminal apparatus 1 not configured with the third parameter, in a case of receiving the second DCI including the CSI request field, may immediately clear the configured grant and/or release the uplink resource regardless of whether or not the CSI request field is set to trigger a report.

Figure 8:
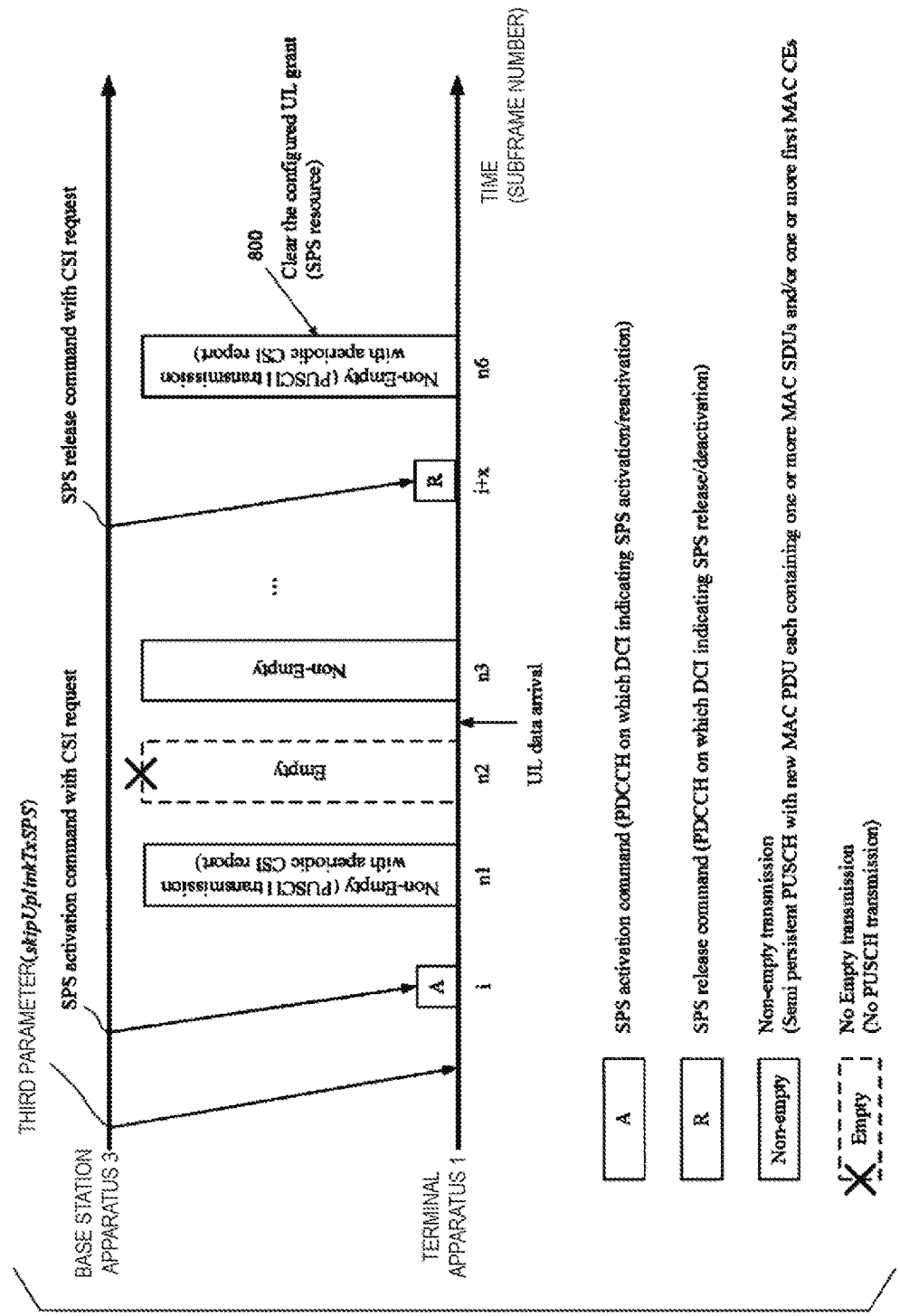
FIG. 8 is a diagram illustrating an example of a method for transmission in uplink according to the present embodiment.

FIG. 8 is a diagram illustrating an example of the method for transmission in uplink according to the present embodiment. Here, FIG. 8 may illustrate the method for transmission (method for process in the second behavior. Specifically, FIG. 8 may correspond to FIG. 6. Specifically, FIG. 8 may illustrate a behavior of the terminal apparatus 1 in the case that the third parameter is configured.

In the subframe i, the terminal apparatus 1 may receive the first DCI including the CSI request field. Here, the terminal apparatus 1, in a case of receiving the first DCI including the CSI request field which is set to trigger a report, may transmit the CSI using the PUSCH (may perform the aperiodic CSI reporting) in a subframe corresponding to the subframe i (e.g., a subframe 4 subframes after the subframe i, for example, a subframe n1).

Specifically, the terminal apparatus 1, in the case of receiving the first DCI including the CSI request field which is set to trigger a report, may always (inevitably) perform the aperiodic CSI reporting. Specifically, the terminal apparatus 1 may always perform the aperiodic CSI reporting in the first subframe (subframe n1) corresponding to a subframe in which received is the first DCI including the CSI request field which is set to trigger a report. Specifically, the terminal apparatus 1, in the case of receiving the DCI including the CSI request field which is set to trigger a report, may always perform the aperiodic CSI reporting using the first PUSCH resource (the first semi-persistent scheduling resource).

Specifically, in a case that the first DCI including the CSI request field which is set to trigger a report indicates the uplink transmission based on the configured uplink grant (the uplink transmission considered to consecutively occur) according to Equation (1) described above, the terminal apparatus 1 may perform the aperiodic CSI reporting in the first uplink transmission (a subframe in which the first uplink transmission is performed).

The terminal apparatus 1, in a case of receiving the first DCI set not to trigger a report, may perform the non-empty transmission in a subframe corresponding to the subframe i. The terminal apparatus 1, in the case of receiving the first DCI set not to trigger a report, may not perform the empty transmission. Specifically, the terminal apparatus 1 having available data for transmission may perform the non-empty transmission. The terminal apparatus 1 having no available data for transmission may not perform the empty transmission.

Here, the terminal apparatus 1 may transmit an acknowledgement response (information indicating ACK or NACK, SPS confirmation) for the first DC1 together with the CSI on the PUSCH. The terminal apparatus 1 may transmit the SPS confirmation for the first DCI upon performing the non-empty transmission. For example, the terminal apparatus 1 may trigger SPS confirmation (an acknowledgement response for the first DCI and/or second DCI) when configured with the third parameter, and may transmit the SPS confirmation for the first DCI in the case of receiving the first DCI.

Specifically, the terminal apparatus 1 may transmit, along with the CSI on the PUSCH, the SPS confirmation for the first DCI transmitted on the PDCCH. Specifically, the terminal apparatus 1 may not transmit an acknowledgement response for the PDSCH (downlink data) but transmit, along with the CSI on the PUSCH, the SPS confirmation for the first DCI (DCI used for scheduling the PUSCH) transmitted on the PDCCH.

In the subframe i+x, the terminal apparatus 1 may receive the second DCI including the CSI request field. Here, the terminal apparatus 1, in a case of receiving the second DCI including the CSI request field which is set to trigger a report, may transmit the CSI using the PUSCH (may perform the aperiodic CSI reporting) in a subframe corresponding to the subframe i+x (e.g., a subframe 4 subframes after the subframe i+x, for example, a subframe n6).

Specifically, the terminal apparatus 1, in the case of receiving the second DCI including the CSI request field which is set to trigger a report, may always (inevitably) perform the aperiodic CSI reporting. Specifically, the terminal apparatus 1 may always perform the aperiodic CSI reporting in the first subframe (subframe n6) corresponding to a subframe in which received is the second DCI including the CSI request field which is set to trigger a report. Specifically, the terminal apparatus 1, in the case of receiving the DCI including the CSI request field which is set to trigger a report, may always perform the aperiodic CSI reporting using the first PUSCH resource (the first semi-persistent scheduling resource).

Here, the terminal apparatus 1, in the case of receiving the second DCI including the CSI request field which is set to trigger a report, may perform the aperiodic CSI reporting, based on the configured grant. Specifically, the terminal apparatus 1 may perform the aperiodic CSI reporting by using the PUSCH (PUSCH resource) scheduled by using the first DCI (the most recent first DCI).

Specifically, the terminal apparatus 1, in the case of receiving the second DCI including the CSI request field which is set to trigger a report, may perform the aperiodic CSI reporting using the PUSCH scheduled by using the first DCI.

The terminal apparatus 1, in the case of receiving the second DCI including the CSI request field which is set to trigger a report, may perform the aperiodic CSI reporting, and may clear the configured grant and/or release the uplink resource (indicated by a numeral 800 in FIG. 8).

The terminal apparatus 1 may clear the configured grant and/or release the uplink resource in a subframe in which received is the second DCI including the CSI request field which is set to trigger a report or in subframes after the subframe in which the second DCI is received.

Here, in the subframe n6, the terminal apparatus 1 may transmit an acknowledgement response (information indicating ACK or NACK, SPS confirmation) for the second DCI along with the CSI on the PUSCH. For example, the terminal apparatus 1 may trigger SPS confirmation (an acknowledgement response for the first DCI and/or second DCI) when configured with the third parameter, and may transmit the SPS confirmation for the second DCI in the case of receiving the second DCI.

Specifically, the terminal apparatus 1 may transmit, along with the CSI on the PUSCH, the acknowledgement response for the second DCI transmitted on the PDCCH. The terminal apparatus 1 may perform the non-empty transmission including the acknowledgement response for the second DCI. Specifically, the terminal apparatus 1 may not transmit an acknowledgement response for the PDSCH (downlink data) but transmit, along with the CSI on the PUSCH, the acknowledgement response for the second DCI transmitted on the PDCCH.

The terminal apparatus 1, in a case of receiving the second DCI set not to trigger a report, may perform the non-empty transmission in the subframe n6. The terminal apparatus 1, in the case of receiving the second DCI set not to trigger a report, may not perform the empty transmission. Specifically, in the subframe n6, the terminal apparatus 1 having available data for transmission may perform the non-empty transmission. In the subframe n6, the terminal apparatus 1 having no available data for transmission may not perform the empty transmission. Here, in the subframe n6, the terminal apparatus 1 may transmit the SPS confirmation.

The terminal apparatus 1, in the case of receiving the second DCI set not to trigger a report, may perform the non-empty transmission, and may clear the configured grant and/or release uplink resource. The terminal apparatus 1 may clear the configured grant and/or release the uplink resource (semi-persistent scheduling resource) immediately after transmitting the SPS confirmation (the aperiodic CSI report and the SPS confirmation). Here, the terminal apparatus 1 may release the uplink resource (semi-persistent scheduling resource) after transmitting the SPS confirmation, and immediately thereafter, may clear the configured grant.

FIG. 9 is another diagram illustrating an example of the method for transmission in uplink according to the present embodiment.

As described above, in the case that terminal apparatus 1 is configured with the third parameter and receives the first DCI including the CSI request field which i s set to trigger a report, the terminal apparatus 1 may perform the aperiodic CSI reporting. Here, in this case, the terminal apparatus 1 may perform the aperiodic CSI reporting in the first subframe corresponding to a subframe in which received is the first DCI including the CSI request field which is set to trigger a report. Specifically, in this case, the terminal apparatus 1 may perform the aperiodic CSI reporting using the first PUSCH resource scheduled by using the first DCI resource (the first semi-persistent scheduling resource).

In the case that terminal apparatus 1 is not configured with the third parameter and receives the first DCI including the CSI request field which is set to trigger a report, the terminal apparatus 1 may perform the aperiodic CSI reporting. Here, in this case, the terminal apparatus 1 may perform the aperiodic CSI reporting in the first subframe corresponding to a subframe in which received is the first DCI including the CSI request field which is set to trigger a report. Specifically, in this case, the terminal apparatus 1 may perform the aperiodic CSI reporting using the first PUSCH resource scheduled by using the first DC1 resource (the first semi-persistent scheduling resource).

In the case that terminal apparatus 1 is configured with the third parameter and receives the first DCI including the CSI request field which is set not to trigger a report, the terminal apparatus 1 may not perform the aperiodic CSI reporting.

Here, the terminal apparatus 1 having available data for transmission may perform the non-empty transmission on the semi-persistent scheduling resource. The terminal apparatus 1 having available data for transmission may not perform the empty transmission (may skip the empty transmission).

In the case that terminal apparatus 1 is not configured with the third parameter and receives the first DCI including the CSI request field which is set not to trigger a report, the terminal apparatus 1 may not perform the aperiodic CSI reporting. Here, the terminal apparatus 1 having available data for transmission may perform the non-empty transmission on the semi-persistent scheduling resource. The terminal apparatus 1 having no available data for transmission may perform the empty transmission.

In the case that terminal apparatus 1 is configured with the third parameter and receives the second DCI including the CSI request field which is set to trigger a report, the terminal apparatus 1 may perform the aperiodic CSI reporting. Here, in this case, the terminal apparatus 1 may perform the aperiodic CSI reporting in the first subframe corresponding to a subframe in which received is the second DCI including the CSI request field which is set to trigger a report. In this case, the terminal apparatus 1 may perform the aperiodic CSI reporting using the first PUSCH resource scheduled by using the first DCI resource (the first semi-persistent scheduling resource). In this case, the terminal apparatus 1 may perform the aperiodic CSI reporting, and may clear the configured grant and/or release uplink resource.

For example, as described above, the terminal apparatus 1 may release the uplink resource (semi-persistent scheduling resource) after transmitting the SPS confirmation (the aperiodic CSI report and the SPS confirmation), and immediately thereafter, may clear the configured grant.

In the case that terminal apparatus 1 is not configured with the third parameter and receives the second DC1 including the CSI request field which is set to trigger a report, the terminal apparatus 1 may not perform the aperiodic CSI reporting. Here in this case, the terminal apparatus 1 may clear the configured grant and/or release the uplink resource immediately after receiving the second DC1 including the CSI request field which is set to trigger a report.

In the case that terminal apparatus 1 is not configured with the third parameter and receives the second DC1 including the CSI request field which is set not to trigger a report, the terminal apparatus 1 may not perform the aperiodic CSI reporting. Here, the terminal apparatus 1 having available data for transmission may perform the non-empty transmission on the semi-persistent scheduling resource. The terminal apparatus 1 having no available data for transmission may skip the empty transmission. The terminal apparatus 1 may transmit the SPS confirmation.

For example, as described above, the terminal apparatus 1 may release the uplink resource (semi-persistent scheduling resource) after transmitting the SPS confirmation, and immediately thereafter, may clear the configured grant.

In the case that terminal apparatus 1 is not configured with the third parameter and receives the first DCI including the CSI request field which is set not to trigger a report, the terminal apparatus 1 may not perform the aperiodic CSI reporting. Here in this case, the terminal apparatus 1 may clear the configured grant and/or release the uplink resource immediately after receiving the second DCI including the CSI request field which is set to trigger a report or in subframes.

Figure 10:
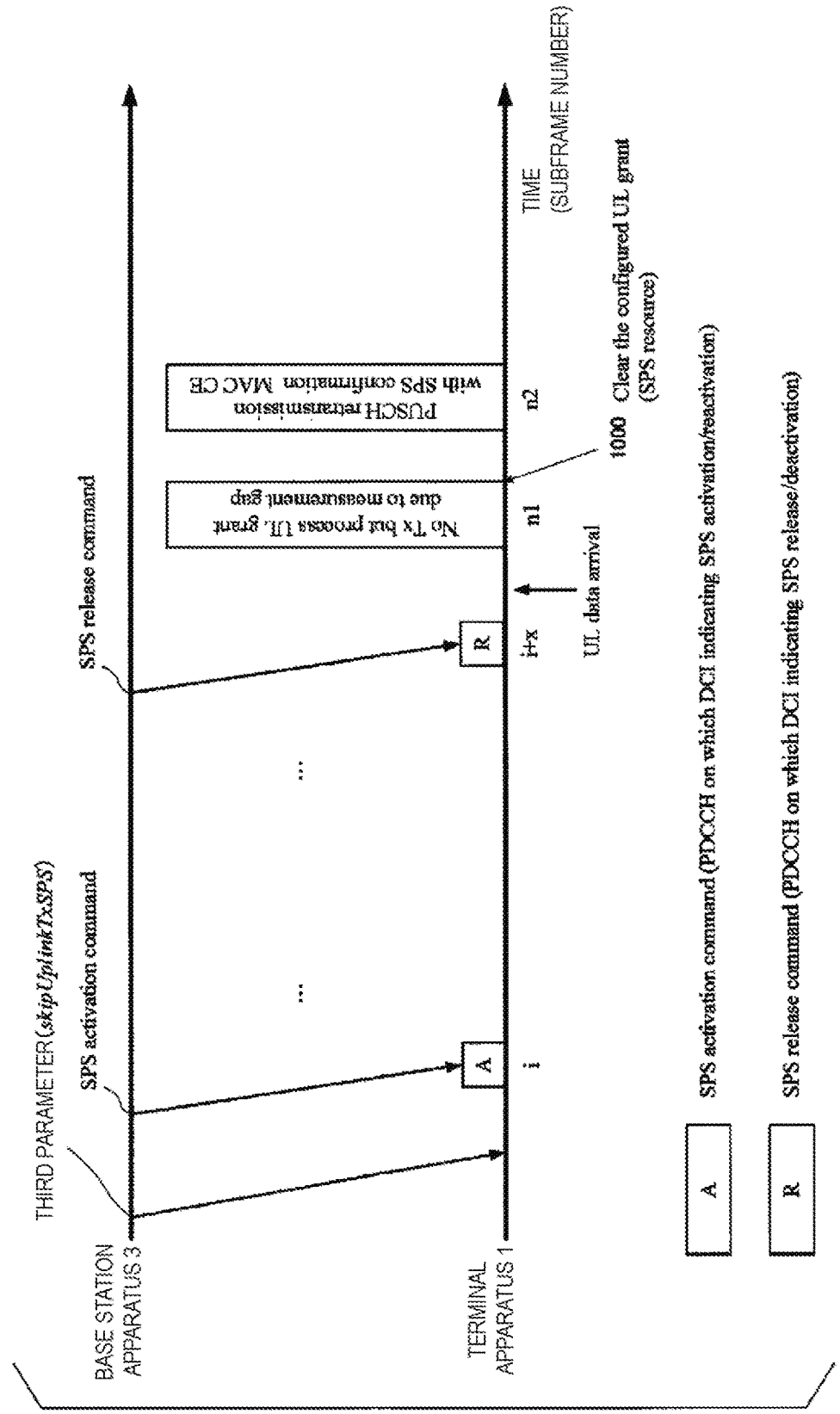
FIG. 10 is another diagram illustrating an example of the method for transmission in uplink according to the present embodiment.

FIG. 10 is another diagram illustrating an example of the method for transmission in uplink according to the present embodiment.

As describe above, the HARQ process in the terminal apparatus 1, based on that the uplink grant stored as the configured uplink grant is cleared by the MAC entity in the terminal apparatus 1, may not clear the stored uplink grant.

To be more specific, even in a case that the uplink grant stored by the MAC entity in the terminal apparatus 1 is cleared, retransmission on the semi-persistent scheduling resource (PUSCH resource) can be performed based on the uplink grant stored by the HARQ process in the terminal apparatus 1.

FIG. 10 illustrates that the terminal apparatus 1 receives the second DCI in the subframe Here, in a case that a subframe corresponding to the subframe in which the second DCI is received (e.g., a subframe 4 subframes after the subframe i+x, for example, a subframe n1) is between measurement gaps, the terminal apparatus 1 may not perform the transmission in uplink (transmission on the UL-SCH, transmission on the PUSCH). Specifically, in a case that the configured uplink grant is indicated between the measurement gaps and the transmission in uplink is indicated between the measurement gaps, the MAC entity in the terminal apparatus 1 processes the uplink grant, but may not perform the transmission in uplink.

Specifically, in the case that the configured uplink grant is indicated between the measurement gaps and the transmission in uplink is indicated between the measurement gaps, the MAC entity in the terminal apparatus 1 may deliver the uplink grant (the configured grant) to the HARQ process. In this case, the MAC entity in the terminal apparatus 1 may clear the configured grant and/or release the uplink resource (indicated by a numeral 1000 in FIG. 10).

Specifically, even in a case that the transmission in uplink is not performed in the subframe n1, the MAC entity in the terminal apparatus 1 may deliver the uplink grant (the configured grant) to the HARQ process, and may clear the configured grant and/or release the uplink resource.

The HARQ process in the terminal apparatus 1 may perform retransmission on the semi-persistent scheduling resource (PUSCH resource), based on the uplink grant delivered from the MAC entity in the terminal apparatus 1. Specifically, the HARQ process in the terminal apparatus 1 may perform the retransmission in the subframe n2.

Configurations of apparatuses according to the present embodiment will be described below.

Figure 11:
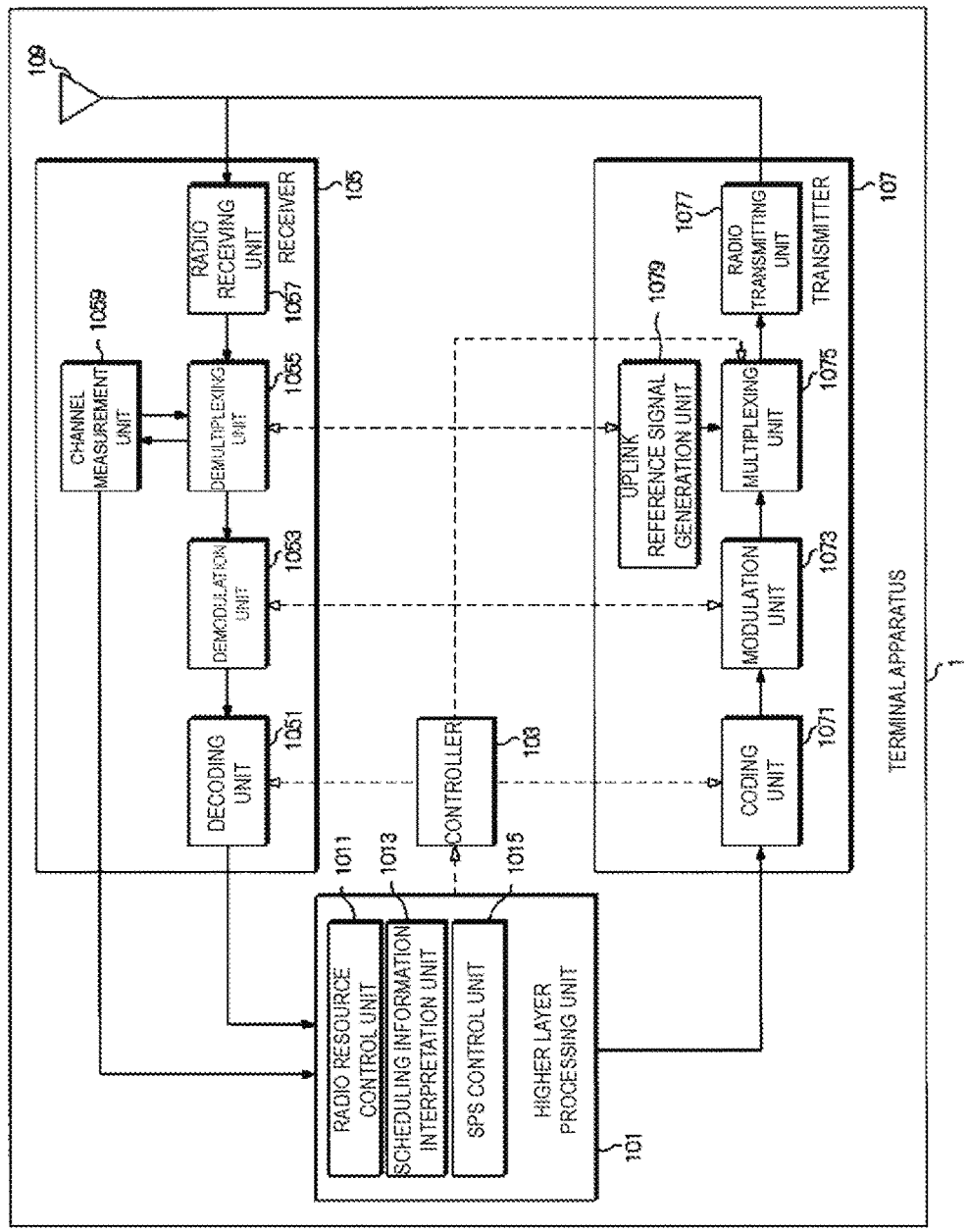
FIG. 11 is a schematic block diagram illustrating a configuration of a terminal apparatus 1 according to the present embodiment.

FIG. 11 is a schematic block diagram illustrating a configuration of the terminal apparatus 1 according to the present embodiment. As illustrated in the figure, the terminal apparatus 1 is configured to include a higher layer processing unit 101, a controller 103, a receiver 105, a transmitter 107, and a transmit and receive antenna 109. The higher layer processing unit. 101 is configured to include a radio resource control unit 1011, a scheduling information interpretation unit 1013, and a SPS control unit 1015. The receiver 105 is configured to include a decoding unit. 10.51, a demodulation unit 1053, a demultiplexing unit 1055, a radio receiving unit 1057, and a channel measurement unit 1059. The transmitter 107 is configured to include a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit. 101 manages various configuration information/parameters of the terminal apparatus 1 itself. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmitter 107. The radio resource control unit 1011 is also referred to as a configuration unit 1011.

Here, the scheduling information interpretation unit 1013 included in the higher layer processing unit 101 interprets the DCI format (scheduling information) received through the receiver 105, generates control information for control of the receiver 105 and the transmitter 107, in accordance with a result of interpreting the DCI format, and outputs the generated control information to the controller 103.

The SPS control unit 1015 included in the higher layer processing unit 101 performs controls concerning the SPS, based on various configuration information, and information or conditions regarding the SPS such as parameters. For example, the higher layer processing unit 101 may perform the processes of the MAC entity in the terminal apparatus 1, the HARQ entity of the terminal apparatus 1, and the first entity in the terminal apparatus 1. Each entity may be configured as an entity unit. The HARQ entity manages at least one HARQ process.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the information resulting from the decoding, to the higher layer processing unit 101.

The radio receiving unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio receiving unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 Outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and receive antenna 109. Furthermore, the transmitter 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BUSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identifier (also referred to as a physical cell identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the controller 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 12:
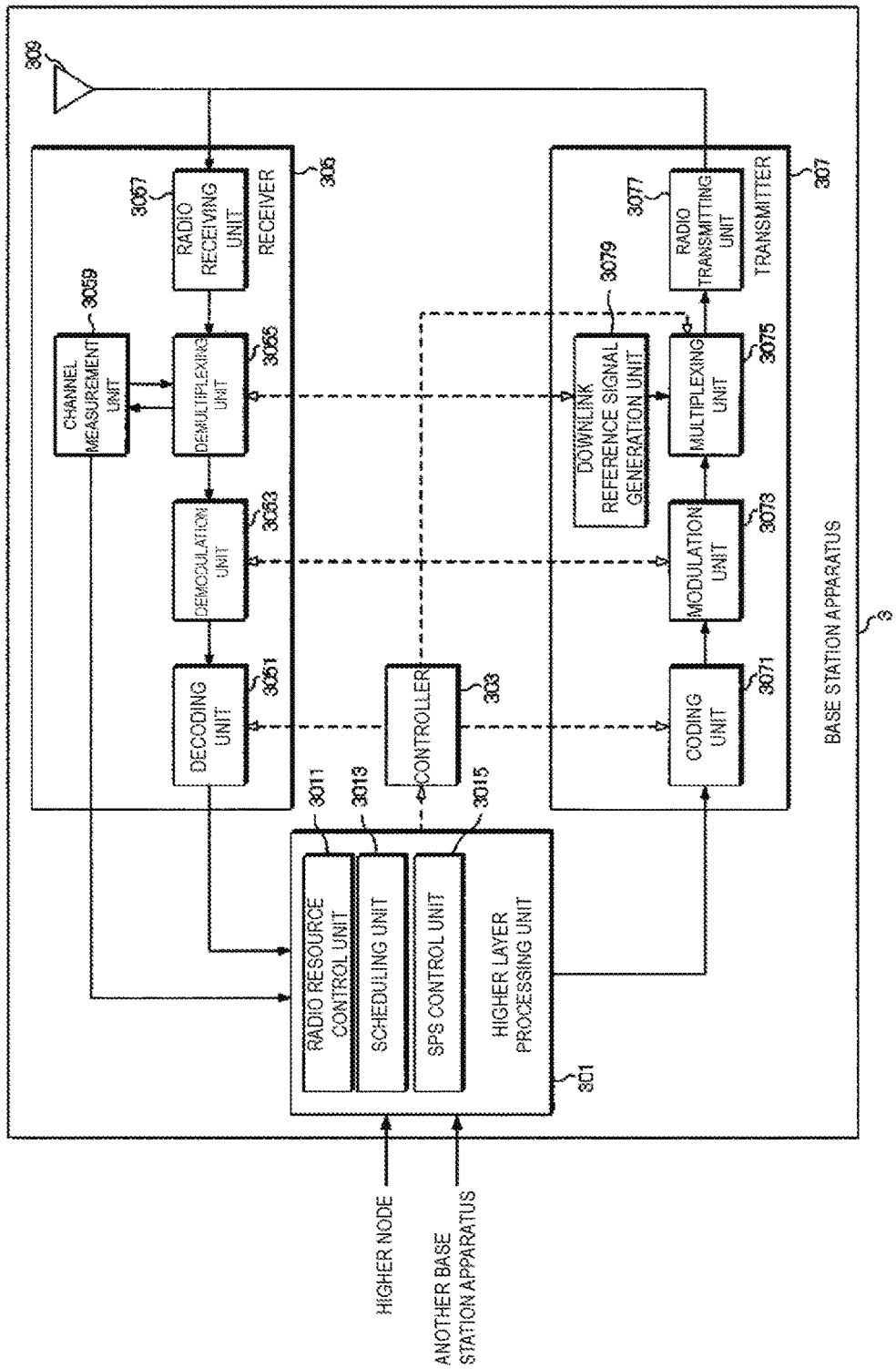
FIG. 12 is a schematic block diagram illustrating a configuration of a base station apparatus 3 according to the present embodiment.

FIG. 12 is a schematic block diagram illustrating a configuration of the base station apparatus 3 according to the present embodiment. As illustrated in the figure, the base station apparatus 3 is configured to include a higher layer processing unit 301, a controller 303, a receiver 305, a transmitter 307, and a transmit and receive antenna 309. The higher layer processing unit 301 is configured to include a radio resource control unit 3011, a scheduling unit 3013, and a SPS control unit 3015. The receiver 305 is configured to include a decoding unit 3051, a demodulation unit 3053, a demultiplexing unit 3055, a radio receiving unit 3057, and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmitter 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the receiver 305 and the transmitter 307 in accordance with a result of the scheduling, and outputs the generated information to the controller 303. The scheduling unit 3013 further determines timing of performing transmission processing and reception processing.

The SPS control unit 3015 included in the higher layer processing unit 301 performs controls concerning the SPS, based on various configuration information, and information or conditions regarding the SPS such as parameters. For example, the higher layer processing unit 301 may perform the processes of the MAC entity in the base station apparatus 3, the HARQ entity of the base station apparatus 3, and the first entity in the base station apparatus 3. The entity may be configured as an entity unit. The HARQ entity manages at least one HARQ process.

In accordance with the control information originating from the higher layer processing unit 301, the controller 303 generates a control signal for control of the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301. The radio receiving unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The receiver 305 receives the uplink control information.

The radio receiving unit 3057 removes a portion corresponding to a Cyclic Prefix (CP) from the digital signal resulting from the conversion. The radio receiving unit 3057 performs Fast Fourier Transform (FFT) on the signal from which the CP has been removed, extracts a signal in the frequency domain, and outputs the resulting signal demultiplexing unit 3055.

The demultiplexing unit 1055 demultiplexes the signal input from the radio receiving unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the preceding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the controller 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal apparatus 1 through the transmit and receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmitting unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

To be more specific, the terminal apparatus 1 according to the present embodiment includes the receiver 105 and the transmitter 107. The receiver 105 receives a RRC message including a parameter (skipUplinkTxSPS) and a first uplink grant used to indicate activation of semi-persistent scheduling. The transmitter 107 stores the first uplink grant as a configured uplink grant, considers that the configured uplink gram is generated in a subframe satisfying a prescribed condition, skips a first transmission corresponding to the configured uplink grant in the first subframe satisfying the prescribed condition in a case that the terminal apparatus 1 is configured with the parameter (skipUplinkTxSPS) and only padding BSR is available for transmission, except for a case that a CSI request field corresponding to the first uplink grant is set to trigger a report, performs a second transmission corresponding to the configured uplink grant in the first subframe satisfying the prescribed condition in a case that the terminal apparatus 1 is configured with the parameter (skipUplinkTxSPS) and receives the first uplink grant including a CSI request field which is set not to trigger a report, and only a padding BSR is not available for transmission, and performs a third transmission corresponding to the configured uplink grant in the first subframe satisfying the prescribed condition in a case of receiving the first uplink grant including a CSI request field which is set to trigger a report regardless of whether or not being configured with the parameter (skipUplinkTxSPS) and whether or not only padding BSR is available for transmission. Here, the third transmission include at least an aperiodic CSI report.

In a case that regardless of whether or not the CSI request field corresponding to the first uplink grant is set to trigger a report, the terminal apparatus 1 is configured with the parameter (skipUplinkTxSPS) and only padding BSR is not available for transmission, the transmitter 107 performs a fourth transmission corresponding to the configured uplink grant in a subframe satisfying the prescribed condition different from the first subframe satisfying the prescribed condition.

In a case that regardless of whether or not the CSI request field corresponding to the first uplink grant is set to trigger a report, the terminal apparatus 1 is configured with the parameter (skipUplinkTxSPS) and only padding BSR is available for transmission, the transmitter 107 skips a fifth transmission corresponding to the configured uplink grant in a subframe satisfying the prescribed condition different from the first subframe satisfying the prescribed condition.

The receiver 107 receives a second uplink grant used to indicate release of the semi-persistent scheduling. In a case that the transmitter 105 receives the second uplink grant including a CSI request field set to a trigger a report regardless of whether or not the terminal apparatus 1 is configured with the parameter (skipUplinkTxSPS) and whether or not only padding BSR is available for transmission, the transmitter 105 performs a sixth transmission corresponding to the configured uplink grant in the first subframe satisfying the prescribed condition. Here, the sixth transmission include at least an aperiodic CSI report.

In a case that the terminal apparatus 1 is configured with the parameter (skipUplinkTxSPS) and only padding BSR is available for transmission except for a case that a CSI request field corresponding to the second uplink grant is set to trigger a report, the transmitter 105 performs a seventh transmission (SPS confirmation)) corresponding to the configured uplink grant in the first subframe satisfying the prescribed condition. Here, the seventh transmission includes at least the SPS confirmation.

In a case that the terminal apparatus is configured with the parameter (skipUplinkTxSPS) and receives the second uplink grant including a CSI request field which is set to trigger a report, and only a padding BSR is not available for transmission, the transmitter 105 performs an eighth transmission corresponding to the configured uplink grant in the first subframe satisfying the prescribed condition. Here, the eighth transmission includes at least the SPS confirmation.

To be more specific, the base station apparatus 3 according to the present embodiment includes the transmitter 307 and the receiver 305. The transmitter 307 transmits a RRC message including a parameter (skipUplinkTxSPS) and a first uplink grant used to indicate activation of semi-persistent scheduling. The receiver 305 stores the first uplink grant as a configured uplink grant, considers that the configured uplink grant is generated in a subframe satisfying a prescribed condition, considers that a first transmission corresponding to the configured uplink grant in the first subframe satisfying the prescribed condition is skipped in a case that the base station apparatus 3 configures the parameter (skipUplinkTxSPS) and the terminal apparatus is in a state that only padding BSR is available for transmission, except for a case that the base station apparatus 3 sets a CSI request field corresponding to the first uplink grant to trigger a report, receives a second transmission corresponding to the configured uplink grant in the first subframe satisfying the prescribed condition in a case that the base station apparatus 3 configures the parameter (skipUplinkTxSPS) and transmits the first uplink grant including a CSI request field which is set not to trigger a report, and the terminal apparatus is in a state that only a padding BSR is not available for transmission, and receives a third transmission corresponding to the configured uplink grant in the first subframe satisfying the prescribed condition in a case of transmitting the first uplink grant including a CSI request field which is set to trigger a report regardless of whether or not configuring the parameter (skipUplinkTxSPS) and whether or not the terminal apparatus is the state that only padding BSR is available for transmission. Here, the third transmission include at least an aperiodic CSI report.

In a case that regardless of whether or not the base station apparatus 3 sets the CSI request field corresponding to the first uplink grant to trigger a report, the base station apparatus 3 configures the parameter (skipUplinkTxSPS) and the terminal apparatus is in the state that only padding BSR is not available for transmission, the receiver 305 receives a fourth transmission corresponding to the configured uplink grant in a subframe satisfying the prescribed condition different from the first subframe satisfying the prescribed condition.

In a case that regardless of whether or not the base station apparatus 3 sets the CSI request field corresponding to the first uplink grant to trigger a report, the base station apparatus 3 configures the parameter (skipUplinkTxSPS) and the terminal apparatus is in the state that only padding BSR is available for transmission, the receiver 305 considers that a fifth transmission corresponding to the configured uplink grant in a subframe satisfying the prescribed condition different from the first subframe satisfying the prescribed condition is skipped.

The receiver 307 transmits a second uplink grant used to indicate release of the semi-persistent scheduling. In a case that the receiver 305 transmits the second uplink grant including a CSI request field set to a trigger a report regardless of whether or not the base station apparatus 3 configures the parameter (skipUplinkTxSPS) and whether or not the terminal apparatus is in the state that only padding BSR is available for transmission, the receiver 305 receives a sixth transmission corresponding to the configured uplink grant in the first subframe satisfying the prescribed condition. Here, the sixth transmission include at least an aperiodic CSI report.

In a case that the parameter (skipUplinkTxSPS) is configured and the terminal apparatus is in the state that only padding BSR is available for transmission except for a case of setting a CSI request field corresponding to the second uplink grant to trigger a report, the receiver 305 receives a seventh transmission (SPS confirmation) corresponding to the configured uplink grant in the first subframe satisfying the prescribed condition. Here, the seventh transmission includes at least the SPS confirmation.

In a case that the base station apparatus 3 configures the parameter (skipUplinkTxSPS) and transmits the second uplink grant including a CSI request field which is set to trigger a report, and the terminal apparatus in the state that only a padding BSR is not available for transmission, the receiver 307 receives an eighth transmission corresponding to the configured uplink grant in the first subframe satisfying the prescribed condition. Here, the eighth transmission includes at least the SPS confirmation.

According to the above, the uplink control information can be transmitted efficiently.

Each of a program running on a base station apparatus 3 and a terminal apparatus 1 according to an aspect of the present invention may be a program that controls a Central Processing Unit (CPU) and the like, such that the program causes a computer to operate in such a manner as to realize the functions of the above-described embodiment according to the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to an aspect of the present invention within the scope defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be used for, for example, a communication system, communication equipment (e.g., mobile phone device, a base station apparatus, a wireless LAN device, or a sensor device), an integrated circuit (e.g., communication chip), a program, or the like.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling information interpretation unit
1015 SPS control unit
3011 Radio resource control unit
3013 Scheduling unit
3015 SPS control unit

The invention claimed is:

1. A terminal device comprising:
receiving circuitry configured to receive on a physical downlink control channel, information used for requesting transmission of Channel State Information (CSI) on a physical uplink shared channel;
transmitting circuitry configured to transmit a first Medium Access Control Protocol Data Unit (MAC PDU) that includes a regular Buffer Status Report (BSR); and
higher layer processing circuitry configured to determine, based on a condition that the transmission of the CSI is not requested by using the information, not to generate a second MAC PDU that includes only a padding BSR,
wherein the information is indicated by a CSI request field that requests the transmission of the CSI.

2. A base station apparatus comprising:
transmitting circuitry configured to transmit on a physical downlink control channel, information used for requesting transmission of Channel State Information (CSI) on a physical uplink shared channel;
receiving circuitry configured to receive a first Medium Access Control Protocol Data Unit (MAC PDU) that includes a regular Buffer Status Report (BSR); and
higher layer processing circuitry configured to consider, based on a condition that the transmission of the CSI is not requested by using the information, that a second MAC PDU that includes only a padding BSR is not generated,
wherein the information is indicated by a CSI request field that requests the transmission of the CSI.

3. A communication method of a terminal device, the method comprising:
- receiving on a physical downlink control channel, information used for requesting transmission of Channel State Information (CSI) on a physical uplink shared channel;
- transmitting a first Medium Access Control Protocol Data Unit (MAC PDU) that includes a regular Buffer Status Report (BSR); and
- determining, based on a condition that the transmission of the CSI is not requested by using the information, not to generate a second MAC PDU that includes only a padding BSR,
- wherein the information is indicated by a CSI request field that requests the transmission of the CSI.

4. A communication method of a base station apparatus, the method comprising:
- transmitting on a physical downlink control channel, information used for requesting transmission of Channel State Information (CSI) on a physical uplink shared channel;
- receiving a first Medium Access Control Protocol Data Unit (MAC PDU) that includes a regular Buffer Status Report (BSR); and
- considering, based on a condition that the transmission of the CSI is not requested by using the information, that a second MAC PDU that includes only a padding BSR is not generated,
- wherein the information is indicated by a CSI request field that requests the transmission of the CSI.

* * * * *